(12) United States Patent
Frey et al.

(10) Patent No.: US 7,818,475 B2
(45) Date of Patent: Oct. 19, 2010

(54) STORAGE SWITCH MIRRORED WRITE SEQUENCE COUNT MANAGEMENT

(75) Inventors: Robert Tower Frey, Milpitas, CA (US); Chao Zhang, Milpitas, CA (US)

(73) Assignee: EMC Corporation, Hopkinton, MA (US)

(*) Notice: Subject to any disclaimer, the term of this patent is extended or adjusted under 35 U.S.C. 154(b) by 1937 days.

(21) Appl. No.: 10/837,240

(22) Filed: Apr. 30, 2004

(65) Prior Publication Data

US 2006/0036821 A1  Feb. 16, 2006

(51) Int. Cl.
*G06F 13/00* (2006.01)
*G06F 12/00* (2006.01)
*G06F 11/00* (2006.01)
*H04L 12/66* (2006.01)
*H04L 12/50* (2006.01)

(52) U.S. Cl. .................... 710/33; 710/34; 711/218; 711/220; 370/231; 370/352; 370/355; 370/357

(58) Field of Classification Search ............. 710/33–34; 711/218, 220; 370/231, 352, 355, 357
See application file for complete search history.

(56) References Cited

U.S. PATENT DOCUMENTS

| | | | |
|---|---|---|---|
| 6,148,000 A * | 11/2000 | Feldman et al. | 370/397 |
| 2003/0067903 A1* | 4/2003 | Jorgensen | 370/338 |
| 2003/0093567 A1* | 5/2003 | Lolayekar et al. | 709/246 |
| 2007/0073805 A1* | 3/2007 | Jorgensen | 709/203 |
| 2007/0086464 A1* | 4/2007 | Somashekhar | 370/392 |

* cited by examiner

*Primary Examiner*—Niketa I Patel
(74) *Attorney, Agent, or Firm*—Barry N. Young

(57) ABSTRACT

A storage switch is disclosed that facilitates mirroring of data. For example, a target is mirrored when an identical (or almost identical) copy of the data is stored in two or more separate physical data stores. Because the various data stores may not be homogenous, they may provide for different burst sizes. To accommodate the different burst sizes, the switch provides different sequence counts for data packets sent to the different data stores that store the mirrored data.

27 Claims, 25 Drawing Sheets

VTD

| VTD ID |
| --- |
| FlowID |
| Extent Descriptors (e.g., size, location) |
| # of outstanding commands |
| Max # of commands |
| Response time |
| LUN |
| TCP control block index |
| S_ID/D_ID |
| MaxCmdSN |
| Total open sequences |

Fig. 4A

| Byte | Byte 0 | Byte 1 | Byte 2 | Byte 3 |
|---|---|---|---|---|
| 0 | X I   0x01 | FRW 00  ATTR | Rsvd | CRN or Rsvd |
| 4 | TotalAHSLength | DataSegmentLength | | |
| 8 | Logical Unit Number (LUN) | | | |
| 16 | Initiator Task Tag | | | |
| 20 | Expected Data Transfer Length | | | |
| 24 | CmdSN | | | |
| 28 | ExpStatSN or ExpDataSN | | | |
| 32 | SCSI Command Descriptor Block (CDB) | | | |
| 48 | | | | | iSCSI Command PDU

Fig. 5a

| Byte | Byte 0 | Byte 1 | Byte 2 | Byte 3 |
|---|---|---|---|---|
| 0 | 1 1   0x31 | 1 | Rsvd (0) | |
| 4 | Rsvd (0) | | | |
| 16 | Initiator Task Tag | | | |
| 20 | Target Transfer Tag | | | |
| 24 | StatSN | | | |
| 28 | ExpCmdSN | | | |
| 32 | MaxCmdSN | | | |
| 36 | R2TSN | | | |
| 40 | Buffer Offset | | | |
| 44 | Desired Data Transfer Length | | | |
| 48 | | | | | iSCSI R2T PDU

Fig. 5b

| Byte | Byte 0 | Byte 1 | Byte 2 | Byte 3 |
|---|---|---|---|---|
| 0 | 0 0   0x05 | F | Rsvd (0) | |
| 4 | Rsvd (0) | DataSegmentLength | | |
| 8 | LUN or Reserved (0) | | | |
| 16 | Initiator Task Tag | | | |
| 20 | Target Transfer Tag or 0xffffffff | | | |
| 24 | Rsvd (0) | | | |
| 28 | ExpCmdSN | | | |
| 32 | Rsvd (0) | | | |
| 36 | DataSN | | | |
| 40 | Buffer Offset | | | |
| 44 | Rsvd (0) | | | |
| 48 | Data | | | | iSCSI Write Data PDU

Fig. 5c

| Byte | Byte 0 | Byte 1 | Byte 2 | Byte 3 |
|---|---|---|---|---|
| 0 | 1 1   0x25 | F       O U S | Rsvd (0) | Status or Rsvd |
| 4 | Rsvd (0) | DataSegmentLength | | |
| 8 | Rsvd (0) | | | |
| 16 | Initiator Task Tag | | | |
| 20 | Rsvd (0) | | | |
| 24 | StatSN or Rsvd (0) | | | |
| 28 | ExpCmdSN | | | |
| 32 | MaxCmdSN | | | |
| 36 | DataSN | | | |
| 40 | Buffer Offset | | | |
| 44 | Residual Count | | | |
| 48 | Data | | | | iSCSI Read Data PDU

Fig. 5d

|   | Byte 0 | Byte 1 | Byte 2 | Byte 3 |
|---|---|---|---|---|
| 0 | 1 1  0x21 | 1 rsv 0 u 0 u 0 | Status | Response |
| 4 | Rsvd (0) | DataSegmentLength | | |
| 8 | Rsvd (0) | | | |
| 16 | | | | |
| 20 | Initiator Task Tag | | | |
| 24 | Basic Residual count | | | |
| 28 | StatSN | | | |
| 32 | ExpCmdSN | | | |
| 36 | MaxCmdSN | | | |
| 40 | ExpDataSN or Rsvd (0) | | | |
| 44 | ExpR2TSN or Rsvd (0) | | | |
| 48 | Bidi-Read Residual Count | | | |
|   | Sense Data and Response Data (optional) | | | | iSCSI Response PDU

Fig. 5e

| Bits Word | 31-24 | 23-16 | 15-08 | 07-00 |
|---|---|---|---|---|
| 0 | R_CTL | D_ID | | |
| 1 | rsvd | S_ID | | |
| 2 | TYPE | F_CTL | | |
| 3 | SEQ_ID | DF_CTL | SEQ_CNT | |
| 4 | OX_ID | | RX_ID | |
| 5 | RLTV_OFF | | | |

FC Frame Header

Fig. 5f

| Field Name | Description | Size |
|---|---|---|
| FCP_LUN | logical unit number | 8 bytes |
| FCP_CNTL | control field | 4 bytes |
| FCP_CDB | SCSI command descriptor block | 16 bytes |
| FCP_DL | Data Length | 4 bytes |

FCP_CMND Payload

Fig. 5g

| Field Name | Description | Size |
|---|---|---|
| DATA_RO | Relative offset of first byte of FCP_DATA IU that follows | 4 bytes |
| BURST_LEN | length of FCP_DATA IU that follows | 4 bytes |
| rsvd | | 4 bytes |

FCP_XFR_RDY Payload

Fig. 5h

| Field Name | Description | Size |
|---|---|---|
| rsvd | | 4 bytes |
| rsvd | | 4 bytes |
| FCP_STATUS | field validity and SCSI status | 4 bytes |
| FCP_RESID | residual count | 4 bytes |
| FCP_SNS_LEN | Length of FCP_SNS_INFO field | 4 bytes |
| FCP_RSP_LEN | Length of FCP_RSP_INFO field | 4 bytes |
| FCP_RSP_INFO | FCP response info | m bytes |
| FCP_SNS_INFO | FCP sense info | n bytes |

FCP_RSP Payload

Fig. 5i

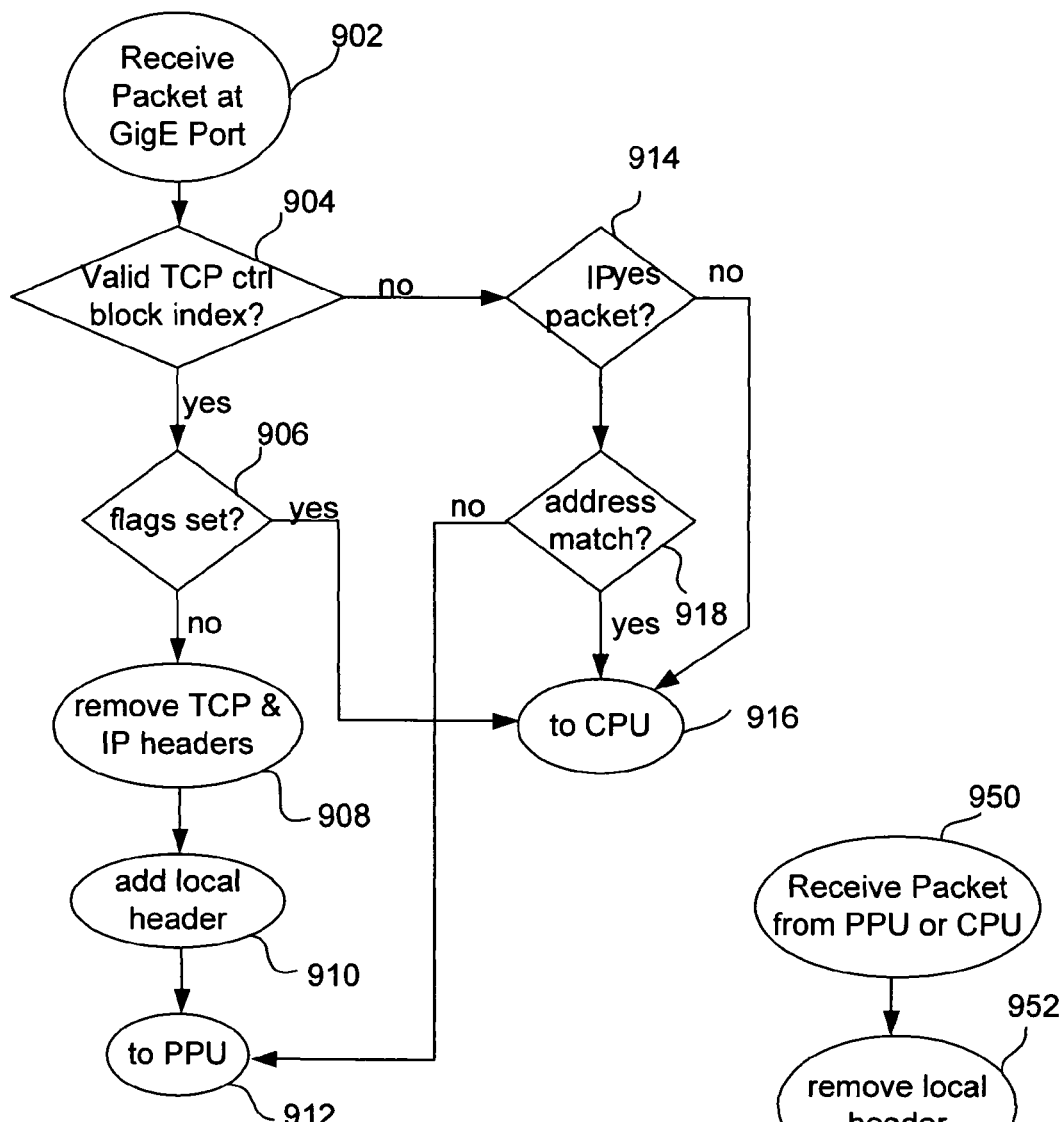
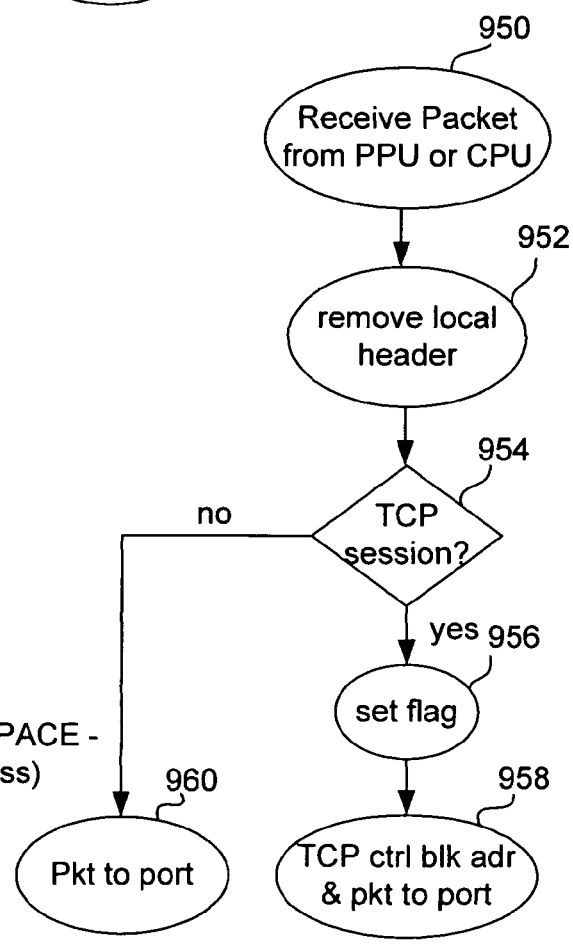
Fig 6
(Classification - PACE - iSCSI - ingress)
Fig 7
(Classification - PACE - iSCSI - egress)

Local Header                    1100

| VTD ID |
| FlowID |
| TCP Control Block Index |
| Type |
| Size |
| Task Index |
| Source (Port, PACE, Linecard, CPU) |
| Destination (Port, PACE, Linecard, CPU) |
| RC |
| IBSC |

Fig. 10

(classification - PACE - FCP - ingress)

(classification - PACE - FCP - egress)

(Classification - PPU - ingress)

(Classification - PPU - egress)

(Virtualization Ingress - cmd)

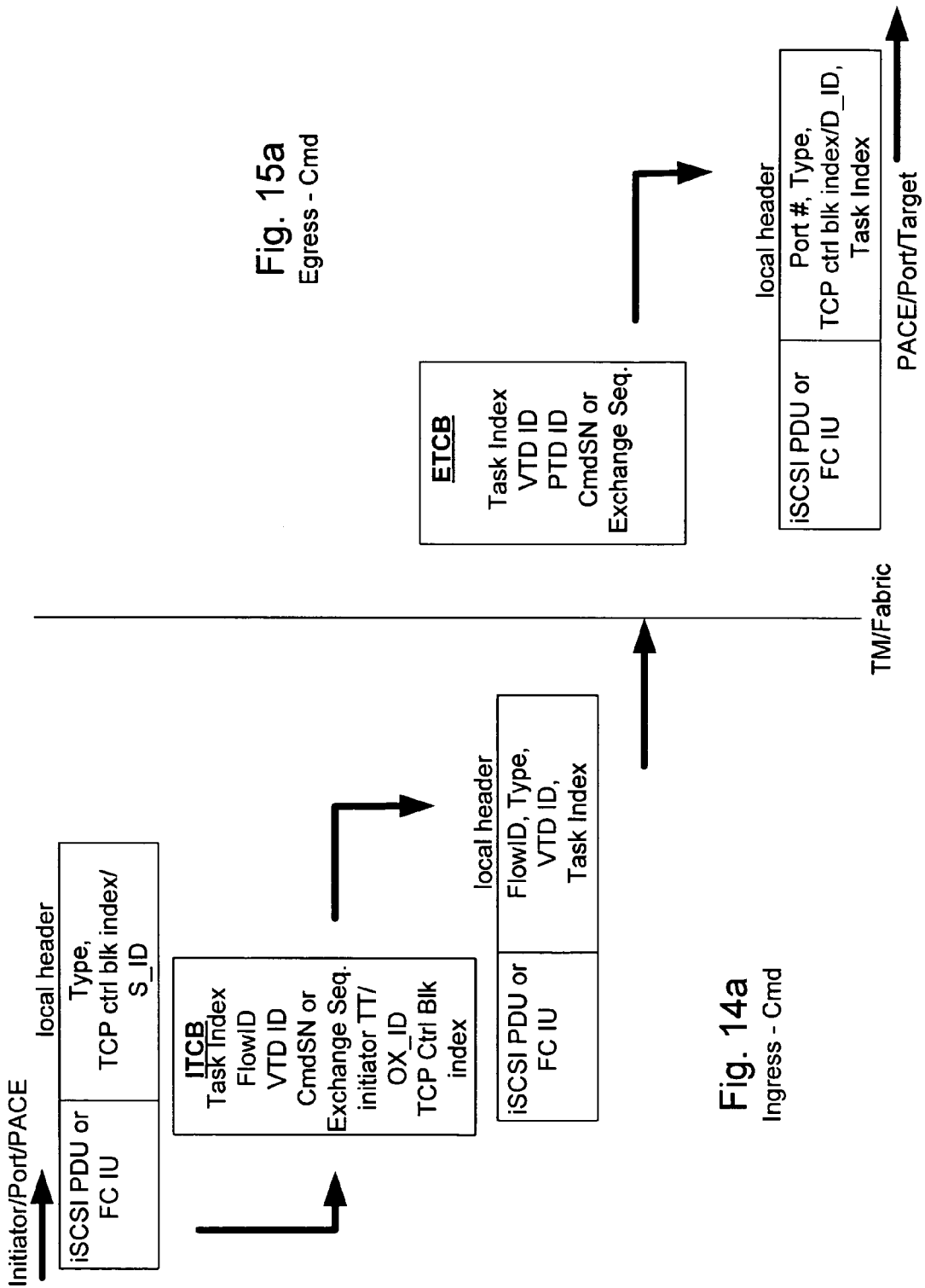

(Virtualization - Egress - cmd)

(Virtualization - Ingress - R2T/XFR_RDY)

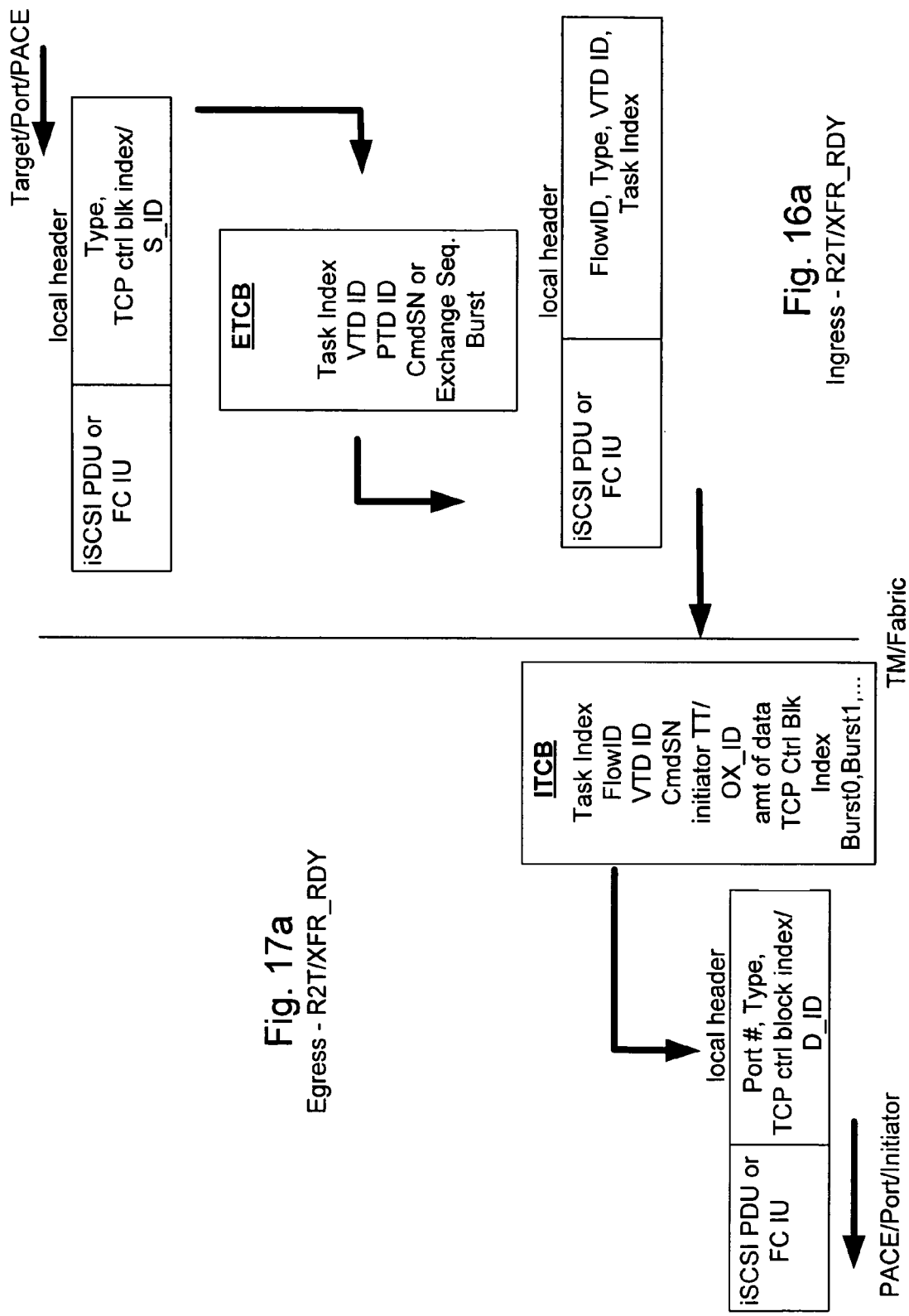

(Virtualization - Egress - R2T/XFR_RDY)

(Virtualization - Ingress - write data packet)

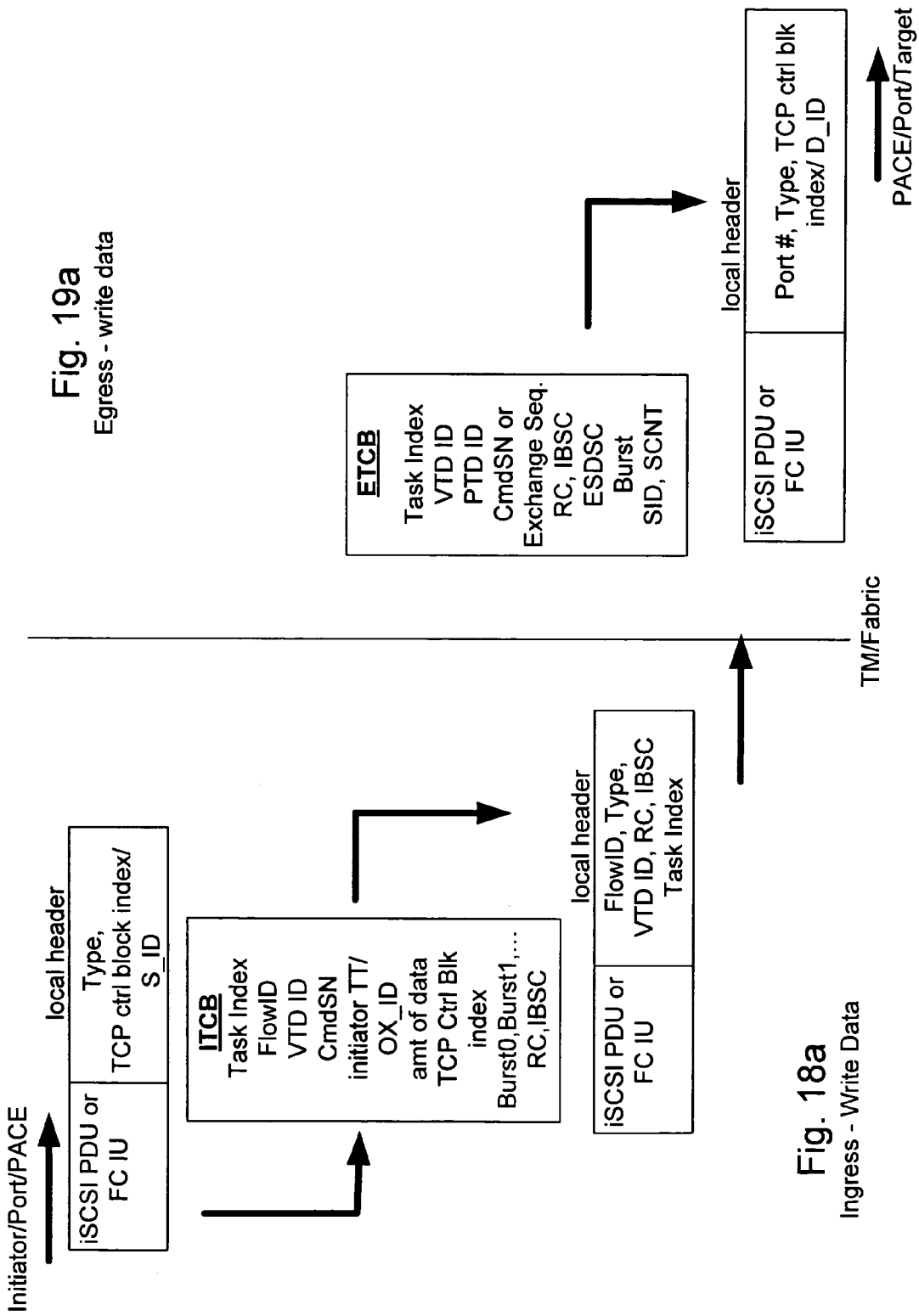

(Virtualization - Egress - write data pkt)

(sequence count)

STORAGE SWITCH MIRRORED WRITE SEQUENCE COUNT MANAGEMENT

CROSS-REFERENCE TO RELATED APPLICATIONS

The following applications are cross-referenced and incorporated by reference herein in their entirety:

U.S. patent application Ser. No. 10/833,438, entitled PROACTIVE TRANSFER READY RESOURCE MANAGEMENT IN STORAGE AREA NETWORKS, filed Apr. 28, 2004;

U.S. patent application Ser. No. 10/833,457, entitled REACTIVE DEADLOCK MANAGEMENT IN STORAGE AREA NETWORKS, filed Apr. 28, 2004, now U.S. Pat. No. 7,484,058, issued Jan. 27, 2009;

U.S. patent application Ser. No. 10/837,248, entitled ONLINE INITIAL MIRROR SYNCHRONIZATION AND MIRROR SYNCHRONIZATION VERIFICATION IN STORAGE AREA NETWORKS, filed Apr. 30, 2004, now U.S. Pat. No. 7,529,781, issued May 5, 2009;

U.S. patent application Ser. No. 10/051,321, entitled STORAGE SWITCH FOR STORAGE AREA NETWORK, filed Jan. 18, 2002;

U.S. patent application Ser. No. 10/051,396, entitled VIRTUALIZATION IN A STORAGE SYSTEM, filed Jan. 18, 2002; and U.S. patent application Ser. No. 10/051,339, entitled ENFORCING QUALITY OF SERVICE IN A STORAGE NETWORK, filed Jan. 18, 2002, now U.S. Pat. No. 7,421,509, issued Sep. 2, 2008.

BACKGROUND OF THE INVENTION

1. Field of the Invention

The present invention relates to storage area networks (SANs).

2. Description of the Related Art

The management of information is becoming an increasingly daunting task in today's environment of data intensive industries and applications. More particularly, the management of raw data storage is becoming more cumbersome and difficult as more companies and individuals are faced with larger and larger amounts of data that must be effectively, efficiently, and reliably maintained. Entities continue to face the necessity of adding more storage, servicing more users, and providing access to more data for larger numbers of users.

The concept of storage area networks or SAN's has gained popularity in recent years to meet these increasing demands. Although various definitions of a SAN exist, a SAN can generally be considered a network whose primary purpose is the transfer of data between computer systems and storage elements and among storage elements. A SAN can form an essentially independent network that does not have the same bandwidth limitations as many of its direct-connect counterparts including storage devices connected directly to servers (e.g., with a SCSI connection) and storage devices added directly to a local area network (LAN) using traditional Ethernet interfaces, for example.

In a SAN environment, targets, which can include storage devices (e.g., tape drives and RAID arrays) and other devices capable of storing data, and initiators, which can included servers, personal computing devices, and other devices capable of providing write commands and requests, are generally interconnected via various switches and/or appliances. The connections to the switches and appliances are usually Fibre Channel. This structure generally allows for any initiator on the SAN to communicate with any target and vice versa. It also provides alternative paths from initiator to target. In other words, if a particular initiator is slow or completely unavailable, another initiator on the SAN can provide access to the target. A SAN also makes it possible to mirror data, making multiple copies available and thus creating more reliability in the availability of data. When more storage is needed, additional storage devices can be added to the SAN without the need to be connected to a specific initiator, rather, the new devices can simply be added to the storage network and can be accessed from any point.

Some SAN's utilize appliances to perform storage management for the SAN. A typical appliance may receive and store data within the appliance, then, with an internal processor for example, analyze and operate on the data in order to forward the data to the appropriate target(s). Such store-and-forward processing can slow down data access, including the times for reading data from and writing data to the storage device(s).

While appliances can perform switching operations, switches are often used to connect initiators with appliances, given the large number of initiators and small number of ports included in many appliances. In more current SAN implementations, switches have replaced certain functionality previously preformed by appliances such that appliances are not necessary and can be eliminated from the systems.

SANs, typically through switches and/or appliances, perform virtualization functions to allocate space of one or more physical targets to a particular user with the physical space remaining unknown to the user. For example, a company may utilize a SAN to provide data storage that employees access for data storage and retrieval. A engineering department, for example, may have storage allocated as "engineering storage space." The employees may see and interact with the virtual space as they would see or interact with a physical storage device such as an attached hard disk drive. Nevertheless, the space may actually be divided over multiple physical storage devices and even be fragmented within single storage devices. A switch or appliance can receive a request for a virtual space and block number(s) and determine the device(s) and portions thereof that physically correlate to the virtual space requested in order to direct the data accordingly.

More recent storage area network switches are capable of routing data between initiators and targets without buffering the data as required by earlier appliances used in SAN's. For example, some storage switches can route data packets without introducing more latency to the packets than would be introduced by a typical network switch. Such unbuffered data transfer between initiators and targets must be handled reliably and efficiently by the switch performing the interconnection. An example of a storage switch can be found in co-pending U.S. patent application Ser. No. 10/051,396, entitled VIRTUALIZATION IN A STORAGE SYSTEM, filed Jan. 18, 2002.

For example, an important feature of SANs is the ability to reliably and efficiently store data in multiple data stores through mirroring. Some networks may include a storage area (or virtual target) that maintains multiple copies of data in multiple physical locations for increased reliability. Accordingly, a switch in such a network may route data to two storage devices, for example, in response to a request to write data to the storage area. Typically, physical targets are only able to handle a limited number of transfer requests at a given time. When routing data to be mirrored using a buffered approach, data packets may be maintained in the connecting device until each target is able to receive the data. If the data is to be written to two physical devices for example, data may be written to the first device at a first time when the first device is available and to a second device at a second time when the second device is available. The use of such a buffer, however, causes a performance penalty. Furthermore, it is difficult to preserve the buffer across power failures and the buffer adds more points of failure to the switch.

Unbuffered data transfer between servers and targets can present further obstacles to the switches routing such data. In an unbuffered approach, data packets are not maintained or buffered at the connecting device when routing data in operations such as mirroring operations. Accordingly, each target for which data is destined must be available to receive the data before the data is sent from the initiating device. For example, a device may wait to receive transfer ready signals from each target before issuing a transfer ready signal to the initiating device.

One issue that arises is that the various targets may not be homogenous. That is, they can be configured differently, in different states, running different software, utilizing different hardware or otherwise acting differently such that the different targets will specify in the transfer ready replies that they are available to receive different amount of data. The amount of data a particular member is ready to receive is called the burst size. For example, a first data store may be ready to receive a 2K block of data, while a second data store is ready to receive a 3K block of data.

Thus, there is a need to provide data mirroring without the performance penalties and risks associated with buffered data transfer, while being able to store data in data stores that are not homogenous.

SUMMARY OF THE INVENTION

A storage switch is disclosed that performs mirroring. In one embodiment, the switch does not buffer data sent and received by servers and storage devices. In order for a server to write to a storage switch mirrored logical unit, the storage switch receives permission (e.g., a transfer ready reply) from all storage devices that makeup the mirrored logical unit. One coalesced transfer ready is returned to the server from the storage switch, which allows the server to send data to the storage switch. The storage switch forwards this data to the storage devices.

Data frames sent by the server have a sequence count. In one embodiment, the sequence count starts with 0 after each transfer ready is returned to the server. The sequence count of the data frames is translated by the storage switch into a new customized sequence counts for some or all of the storage devices that compose the storage switch mirrored logical unit.

One embodiment of the present invention includes receiving a data unit for storage on a first data store, where the first data store mirrors a second data store. Sequencing information is also received for the data unit. A sequence number, based on said sequencing information, is determined for the data unit relative to said first data store. The sequence number and the data unit are provided to the first data store.

One example of an implementation includes one or more processing units, and one or more ports in communication with the one or more processing units. The processing units receive data units that are to be stored in multiple data stores and translate sequence counts in the data units differently for different data stores accepting different burst sizes.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The one or more processors can be in communication with one or more storage devices (hard disk drives, CD-ROMs, DVDs, optical disks, floppy disks, tape drives, RAM, ROM, flash memory or other suitable storage devices), peripherals (printers, monitors, keyboards, pointing devices) and/or communication interfaces (e.g. network cards, wireless transmitters/receivers, etc.).

These and other objects and advantages of the present invention will appear more clearly from the following description in which the preferred embodiment of the invention has been set forth in conjunction with the drawings.

BRIEF DESCRIPTION OF THE DRAWINGS

FIG. 4a is a generalized block diagram of a Virtual Target Descriptor used in a storage switch in accordance with an embodiment of the invention.

FIGS. 5a-5e are generalized block diagrams of various iSCSI PDUs, as are known in the art.

FIGS. 5f-5i are generalized block diagrams of Fibre Channel Protocol (FCP) frames and payloads, as are known in the art.

FIG. 6 is a flow diagram illustrating a classification process of iSCSI packets in the ingress direction as the process occurs in the PACE, in accordance with an embodiment of the invention.

FIG. 7 is a flow diagram illustrating a classification process of iSCSI packets in the egress direction as the process occurs in the PACE, in accordance with an embodiment of the invention.

FIG. 10 is a generalized block diagram of a Local Header used in a storage switch in accordance with an embodiment of the invention.

FIGS. 14a and 15a illustrate block diagrams of the local header and task control blocks (ITCB and ETCB) during a virtualization process, where FIG. 14a shows the header and ITCB for a command packet in the ingress direction (from the initiator server/port) and where FIG. 15a shows a header and ETCB for a command packet in the egress direction (from the fabric/traffic manager).

FIGS. 16a and 17a illustrate block diagrams of the local header and task control blocks (ITCB and ETCB) during a virtualization process, where FIG. 16a shows the header and ETCB for a R2T/XFR_RDY packet in the ingress direction (from the target storage device/port) and where FIG. 17a shows a header and ITCB for a R2T/XFR_RDY packet in the egress direction (from the fabric/traffic manager).

FIGS. 18a and 19a illustrate block diagrams of the local header and task control blocks (ITCB and ETCB) during a virtualization process, where FIG. 18a shows the header and ITCB for a write data packet in the ingress direction (from the Initiator server/port) and where FIG. 19a shows a header and ETCB for a write data packet in the egress direction (from the fabric/traffic manager).

DETAILED DESCRIPTION

The invention is illustrated by way of example, and not by way of limitation, in the figures of the accompanying drawings in which like references indicate similar elements. It should be noted that references to an or one embodiment in this disclosure are not necessarily the same embodiment, and such references mean at least one.

In the following description, various aspects of the present invention will be described. However, it will be apparent to those skilled in the art that the present invention may be practiced with only some or all of the aspects of the present disclosure. For purposes of explanation, specific numbers, materials and configurations are set forth in order to provide a thorough understanding of the invention. However, it will be apparent to one skilled in the art that the present invention may be practiced without all of the specific details. In other instances, well known features are omitted or simplified in order not to obscure the present invention.

Various embodiments will be described as multiple discreet steps in turn, in a manner that is most helpful in understanding the present invention. However, the order of this description should not be construed as to imply that these operations are necessarily order dependent.

Figure 1:
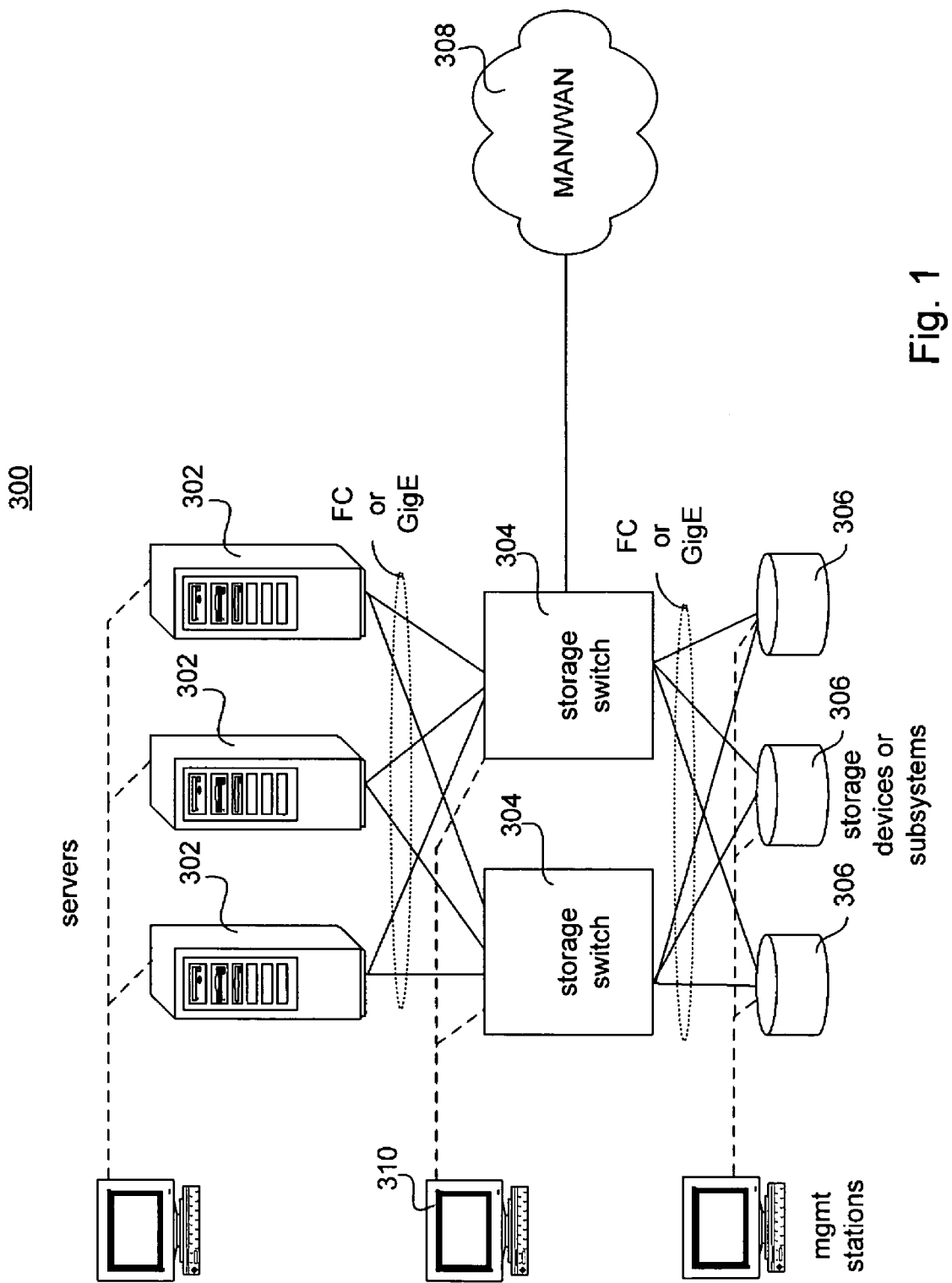
FIG. 1 is a generalized function block diagram of a SAN system using a storage switch in accordance with an embodiment of the invention.

A system 300 that includes a storage switch in accordance with the invention is illustrated in FIG. 1. In one embodiment, system 300 includes a plurality of servers 302. For purposes of illustration only, three servers 302 are shown, although more or fewer servers could be used in other embodiments. Although not shown, the servers could also be coupled to a LAN. As shown, each server 302 is connected to a storage switch 304. In other embodiments, however, each server 302 may be connected to fewer than all of the storage switches 304. The connections formed between the servers and switches can utilize any protocol, although in one embodiment the connections are either Fibre Channel (FC) or Gigabit Ethernet (carrying packets in accordance with the iSCSI protocol). Other embodiments may use the Infiniband protocol, defined by Intel Inc., or other protocols or connections. In the embodiment illustrated, each switch is in turn connected to each of a plurality of storage devices or subsystems 306. Nonetheless, in other embodiments, each switch may be connected to fewer than all of the storage devices or subsystems 306. The connections formed between the storage switches and storage devices can utilize any protocol, although in one embodiment the connections are either Fibre Channel or Gigabit Ethernet. In some embodiments, one or more switches 304 are each coupled to a Metropolitan Area Network (MAN) or Wide Area Network (WAN), such as the Internet 308. The connection formed between a storage switch and a WAN will generally use the Internet Protocol (IP) in most embodiments. Although shown as directly connected to MAN/WAN 308, other embodiments may utilize a router (not shown) as an intermediary between switch 304 and MAN/WAN 308. In addition, respective management stations 310 are connected to each storage switch 304, to each server 302, and to each storage device 306. Although management stations are illustrated as distinct computers, it is to be understood that the software to manage each type of device could collectively be on a single computer.

In an alternative embodiment, two SANs are coupled through a WAN (e.g., the Internet) by way of switches. In another embodiment, switches are coupled directly to one another.

A storage switch in accordance with the invention enables a centralized management of globally distributed storage devices, which can be used as shared storage pools, instead of having a huge number of management stations distributed globally and an army of skilled management personnel. Such a storage switch is an "intelligent" switch, and the functions of switch, appliance, and gateway have effectively been united in a storage switch 304 in accordance with an embodiment of the invention. Such a storage switch 304, in addition to its switching function, provides the virtualization and storage services (e.g., mirroring) that would typically be provided by appliances in conventional architectures, and it also provides protocol translation. A storage switch in accordance with some embodiments of the invention also performs additional functions (for instance, data security through a Virtual Private Network). Such additional functions include functions that are performed by other devices in conventional systems, such as load balancing, which is traditionally performed by the servers, as well as other functions not previously available in conventional systems.

The intelligence of a storage switch in accordance with an embodiment of the invention is distributed to every switch port. This distributed intelligence allows for system scalability and availability.

Further, the distributed intelligence allows a switch in accordance with an embodiment of the invention to process data at "wire speed," meaning that a storage switch 304 introduces no more latency to a data packet than would be introduced by a typical network switch. Thus, "wire speed" for the switch is measured by the connection to the particular port. Accordingly, in one embodiment having OC-48 connections, the storage switch can keep up with an OC-48 speed (2.5 bits per ns). A two Kilobyte packet (with 10 bits per byte) moving at OC-48 speed takes as little as eight microseconds coming into the switch. A one Kilobyte packet takes as little as four microseconds. A minimum packet of 100 bytes only elapses merely 400 ns. Nonetheless, when the term "wire-speed" processing is used herein, it does not mean that such processing needs as few as 400 ns to process a 100-byte packet. However, it does mean that the storage switch can handle the maximum Ethernet packet of 1500 bytes (with ten-bit encoding, so that a byte is ten bits) at OC-48 speed, i.e., in about 6 μs (4 μs per Kilobyte or 2.5 bits per ns), in one embodiment. In embodiments with a 1 Gb Ethernet port, where processing is generally defined as one bit per nanosecond, "wire-speed" data for that port will be 10 μs per Kilobyte, indicating that the switch has up to 10 μs to process a Kilobyte. In embodiments with a 2 Gb Fibre Channel port, "wire speed" will be 5 μs per Kilobyte. Still other embodiments may process data at ten Gigabit Ethernet or OC-192 speeds or faster.

As used herein, "virtualization" essentially means the mapping of a virtual target space subscribed to by a user to a space on one or more physical storage target devices. The terms "virtual" and "virtual target" come from the fact that storage space allocated per subscription can be anywhere on one or more physical storage target devices connecting to a storage switch 304. The physical space can be provisioned as a "virtual target" which may include one or more "logical units" (LUs). Each virtual target consists of one or more LUs identified with one or more LU numbers (LUNs), which are frequently used in the iSCSI and FC protocols. Each logical unit, and hence each virtual target, is generally comprised of one or more extents—a contiguous slice of storage space on a physical device. Thus, a virtual target may occupy a whole storage device (one extent), a part of a single storage device (one or more extents), or parts of multiple storage devices (multiple extents). The physical devices, the LUs, the number of extents, and their exact locations are immaterial and invisible to a subscriber user. While the storage space may come from a number of different physical devices, each virtual target belongs to one or more domains. Only users of the same domain are allowed to share the virtual targets in their domain. A domain-set eases the management of users of multiple domains. The members of a domain set can be members of other domains as well. But a virtual target can only be in one domain in an embodiment of the invention.

Figure 2:
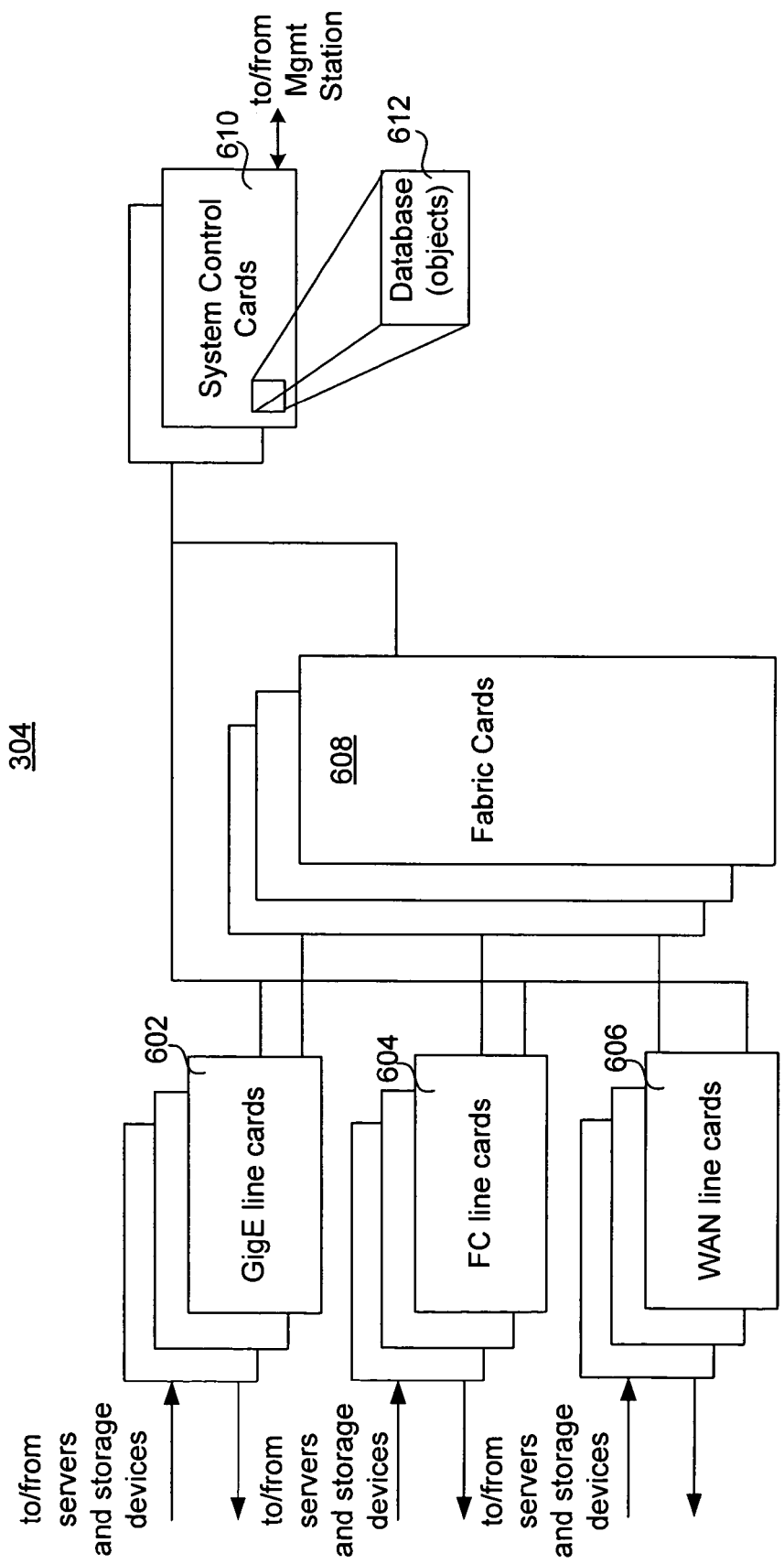
FIG. 2 is a generalized function block diagram of a storage switch in accordance with an embodiment of the invention.

FIG. 2 illustrates a function block diagram of a storage switch 304 in accordance with an embodiment of the invention. In one embodiment, the storage switch 304 includes a plurality of linecards 602, 604, and 606, a plurality of fabric cards 608, and two system control cards 610, each of which will be described in further detail below.

System Control Cards. Each of the two System Control Cards (SCCs) 610 connects to every line card 602, 604, 606. In one embodiment, such connections are formed by I2C signals, which are well known in the art, and through an Ethernet connection with the SCC. The SCC controls power up and monitors individual linecards, as well as the fabric cards, with the I2C connections. Using inter-card communication over the ethernet connections, the SCC also initiates various storage services, e.g., snapshot and replicate, to be discussed further later.

In addition the SCC maintains a database 612 that tracks configuration information for the storage switch as well as all virtual targets and physical devices attached to the switch, e.g., servers and storage devices. In addition, the database keeps information regarding usage, error and access data as well as information regarding different domains and domain sets of virtual targets and users. The records of the database are referred to herein as "objects." Each initiator (e.g., a server) and target (e.g., a storage device) has a World Wide Unique Identifier (WWUI), which are known in the art. The database is maintained in a memory device within the SCC, which in one embodiment is formed from flash memory, although other memory devices will also be satisfactory.

The storage switch 304 can be reached by a management station (310) through the SCC 610 using an ethernet connection. Accordingly, the SCC also includes an additional Ethernet port for connection to a management station. An administrator at the management station can discover the addition or removal of storage devices or virtual targets, as well as query and update virtually any object stored in the SCC database 612.

Of the two SCCs 610, one is the main operating SCC while the other is a backup, remaining synchronized to the actions in the storage switch, but not directly controlling them. The SCCs operate in a high availability mode wherein if one SCC fails, the other becomes the primary controller.

Fabric Cards. In one embodiment of switch 304, there are three fabric cards 608, although other embodiments could have more or fewer fabric cards. Each fabric card 608 is coupled to each of the linecards 602, 604, 606 in one embodiment and serves to connect all of the linecards together. In one embodiment, the fabric cards 608 can each handle maximum traffic when all linecards are populated. Such traffic loads handled by each linecard are up to 160 Gbps in one embodiment although other embodiments could handle higher or lower maximum traffic volumes. If one fabric card 608 fails, the two surviving cards still have enough bandwidth for the maximum possible switch traffic: in one embodiment, each linecard generates 20 Gbps of traffic, 10 Gbps ingress and 10 Gbps egress. However, under normal circumstances, all three fabric cards are active at the same time. From each linecard, the data traffic is sent to any one of the three fabric cards that can accommodate the data.

Linecards. The linecards form connections to servers and to storage devices. In one embodiment, storage switch 304 supports up to sixteen linecards although other embodiments could support a different number. Further, in one embodiment, three different types of linecards are utilized: Gigabit Ethernet (GigE) cards 602, Fibre Channel (FC) cards 604, and WAN cards 606. Other embodiments may include more or fewer types of linecards. The GigE cards 602 are for Ethernet connections, connecting in one embodiment to either iSCSI servers or iSCSI storage devices (or other Ethernet based devices). The FC cards 604 are for Fibre Channel connections, connecting to either Fibre Channel Protocol (FCP) servers or FCP storage devices. The WAN cards 606 are for connecting to a MAN or WAN.

Figure 3:
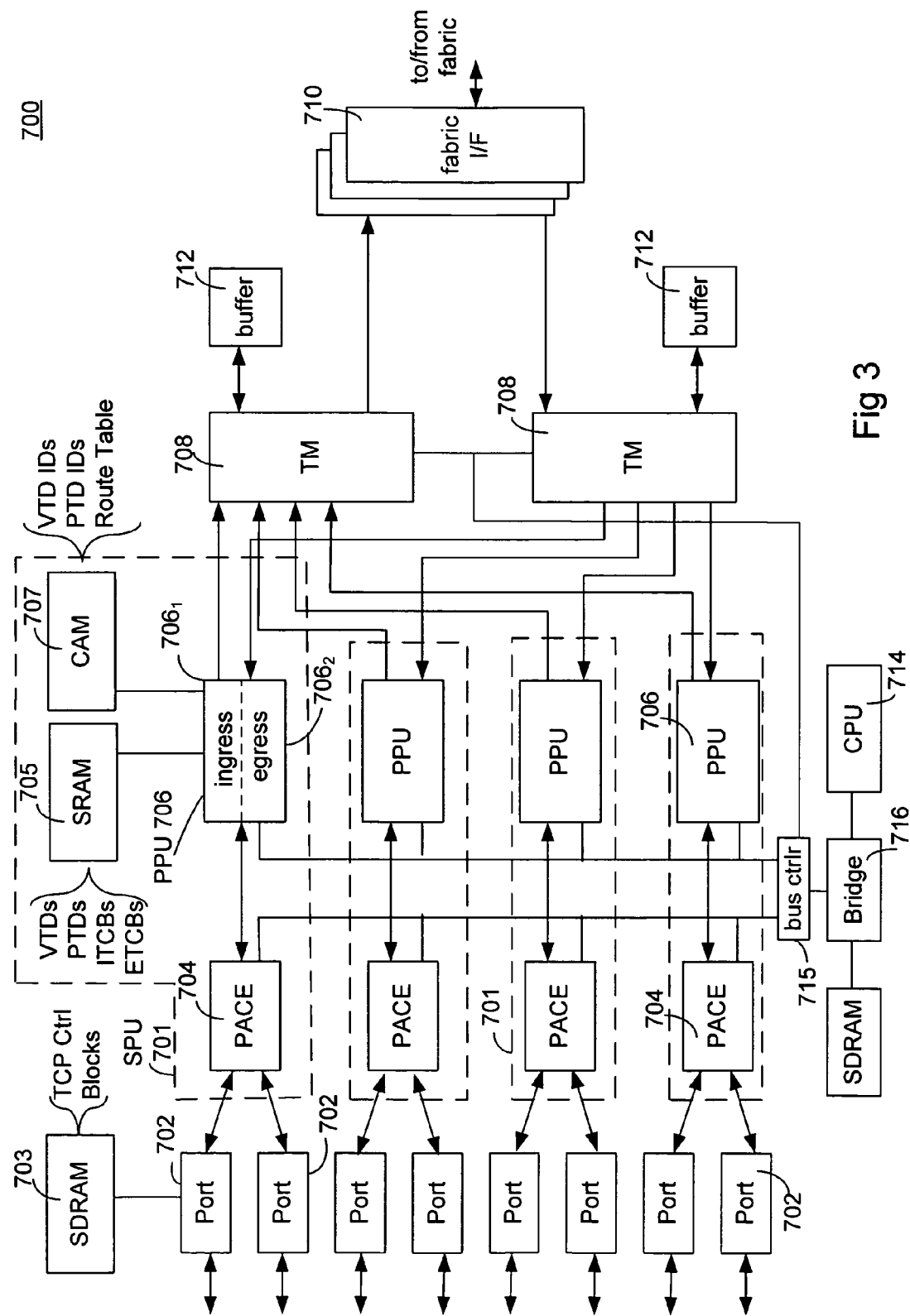
FIG. 3 is a generalized function block diagram of a linecard used in a storage switch in accordance with an embodiment of the invention.

FIG. 3 illustrates a functional block diagram of a generic line card 700 used in one embodiment of a storage switch 304 in accordance with the invention. The illustration shows those components that are common among all types of linecards, e.g., GigE 602, FC 604, or WAN 606. In other embodiments other types of linecards can be utilized to connect to devices using other protocols, such as Infiniband. The differences in the linecards are discussed subsequently.

Ports. Each line card 700 includes a plurality of ports 702. The ports form the linecard's connections to either servers or storage devices. Eight ports are shown in the embodiment illustrated, but more or fewer could be used in other embodiments. For example, in one embodiment each GigE card can support up to eight 1 Gb Ethernet ports, each FC card can support up to either eight 1 Gb FC ports or four 2 Gb FC ports, and each WAN card can support up to four OC-48 ports or two OC-192 ports. Thus, in one embodiment, the maximum possible connections are 128 ports per switch 304. The ports of each linecard are full duplex and connect to either a server or other client, or to a storage device or subsystem.

In addition each port 702 has an associated memory 703. Although only one memory device is shown connected to one port, it is to be understood that each port may have its own memory device or the ports may all be coupled to a single memory device. Only one memory device is shown here coupled to one port for clarity of illustration.

Storage Processor Unit. In one embodiment, each port is associated with a Storage Processor Unit (SPU) 701. The SPU rapidly processes the data traffic allowing for wire-speed operations. In one embodiment, the SPU includes several elements: a Packet Aggregation and Classification Engine (PACE) 704, a Packet Processing Unit (PPU) 706, an SRAM 705, and a CAM 707. Still other embodiments may use more or fewer elements or could combine elements to obtain the same functionality.

PACE. Each port is coupled to a Packet Aggregation and Classification Engine (PACE) 704. As illustrated, the PACE 704 aggregates two ports into a single data channel having twice the bandwidth. For instance, the PACE 704 aggregates two 1 Gb ports into a single 2 Gb data channel. The PACE classifies each received packet into a control packet or a data packet, as will be discussed further below. Control packets are sent to the CPU 714 for processing, via bridge 716. Data packets are sent to a Packet Processing Unit (PPU) 706, discussed below, with a local header added. In one embodiment the local header is sixteen bytes resulting in a data "cell" or "local packet" of 64 bytes (16 bytes of header and 48 bytes of payload). The local header is used to carry information and used internally by switch 204. The local header is removed before the packet leaves the switch. Accordingly, as used herein a "cell" or a "local packet" is a transport unit that is used locally in the switch that includes a local header and the original packet (in some embodiments, the original TCP/IP headers are also stripped from the original packet). Nonetheless, not all embodiments of the invention will create a local header or have "local packets" (cells) that differ from external packets. Accordingly, the term "packet" as used herein can refer to either "local" or "external" packets.

The classification function helps to enable a switch to perform storage virtualization and protocol translation functions at wire speed without using a store-and-forward model of conventional systems. Each PACE has a dedicated path to a PPU 706 while all four PACEs in the illustrated embodiment share a path to the CPU 714, which in one embodiment is a 104 MHz/32 (3.2 Gbps) bit data path.

Packet Processing Unit (PPU). The PPU 706 performs virtualization and protocol translation on-the-fly, meaning, the cells (local packets) are not buffered for such processing. It also implements switch-based storage service functions, described later. The PPU is capable, in one embodiment, of moving cells at OC-48 speed or 2.5 Gbps for both the ingress and egress directions, while in other embodiments it can move cells at OC-192 speeds or 10 Gbps. The PPU, in one embodiment, includes an ingress PPU 7061 and an egress PPU 7062, which both run concurrently. The ingress PPU 7061 receives incoming data from PACE 704 and sends data to the Traffic Manager 708 while the egress PPU 7062 receives data from Traffic Manager 708 and sends data to a PACE 704.

A large number of storage connections (e.g., server to virtual target) can be established concurrently at each port. Nonetheless, each connection is unique to a virtual target and can be uniquely identified by a TCP Control Block Index (in the case of iSCSI connections) and a port number. When a connection is established, the CPU 714 of the linecard 700 informs the PPU 706 of an active virtual target by sending it a Virtual Target Descriptor (VTD) for the connection. The VTD includes all relevant information regarding the connection and virtual target that the PPU will need to properly operate on the data, e.g., perform virtualization, translation, and various storage services. The VTD is derived from an object in the SCC database and usually contains a subset of information that is stored in the associated object in the SCC database. An example of the fields in a VTD in one embodiment of the invention are shown in FIG. 4A. Nonetheless, other embodiments of the invention may have a VTD with more, fewer, or different fields.

To store the VTDs and have quick access to them, in one embodiment the PPUs 706 are connected to an SRAM 705 and CAM 707. SRAM 705 stores a VTD database. A listing of VTD identifiers (VTD IDs), or addresses, is also maintained in the PPU CAM 707 for quick accessing of the VTDs. The VTD IDs are indexed (mapped) using a TCP Control Block Index and a LUN. In addition, for IP routing services, the CAM 707 contains a route table, which is updated by the CPU when routes are added or removed.

Note that although only one CAM and an SRAM are illustrated as connected to one PPU, this is to maintain clarity of the illustration. In various embodiments, each PPU will be connected with its own CAM and SRAM device, or the PPUs will all be connected to a single CAM and/or SRAM.

For each outstanding request to the PPU (e.g., reads or writes), a task control block is established in the PPU SRAM 707 to track the status of the request. There are ingress task control blocks (ITCBs) tracking the status of requests received by the storage switch on the ingress PPU and egress task control blocks (ETCBs) tracking the status of requests sent out by the storage switch on the egress PPU. For each virtual target connection, there can be a large number of concurrent requests, and thus many task control blocks. Task control blocks are allocated as a request begins and freed as the request completes.

Traffic Manager. There are two traffic managers (TMs) 708 on each linecard 700: one TM for ingress traffic and one TM for egress traffic. The ingress TM receives cells from all four SPUs, in the form of multiple 64-byte data cells, in one embodiment. In such an embodiment, each data cell has 16 bytes of local header and 48 bytes of payload. The header contains a FlowID that tells the TM the destination port of the cell. In some embodiments, the SPU may also attach a TM header to the cell prior to forwarding the cell to the TM. Either the TM or the SPU can also subdivide the cell into smaller cells for transmission through the fabric cards in some embodiments.

The ingress TM sends data cells to the fabric cards via a 128-bit 104 Mhz interface 710 in one embodiment. Other embodiments may operate at 125 MHz or other speeds. The egress TM receives the data cells from the fabric cards and delivers them to the four SPUs.

Both ingress and egress TMs have a large buffer 712 to queue cells (local packets) for delivery. Both buffers 712 for the ingress and egress TMs are 64 MB, which can queue a large number of packets for internal flow control within the switch. The cells are not buffered as in cached or buffered switch implementations. There is no transport level acknowledgement as in these systems. The cells are only temporarily buffered to maintain flow control within the switch. The cells maintain their original order and there is no level high level processing of the cells at the TM The SPUs can normally send cells to the ingress TM quickly as the outgoing flow of the fabric cards is as fast as the incoming flow. Hence, the cells are moving to the egress TM quickly. On the other hand, an egress TM may be backed up because the outgoing port is jammed or being fed by multiple ingress linecards. In such a case, a flag is set in the header of the outgoing cells to inform the egress SPU to take actions quickly. The egress TM sends a request to the ingress SPU to activate a flow control function. It is worth noting that, unlike communications traffic over the Internet, for storage traffic dropping a packet or cell is unacceptable. Therefore, as soon as the amount of cells in the buffer exceeds a specified threshold, the SPU must activate its flow control function to slow down the incoming traffic to avoid buffer overflow.

Fabric Connection. The fabric connection 710 converts the 256-bit parallel signals of the TM (128 bits ingress and 128 bits egress, respectively), into a 16-bit serial interface (8-bit ingress and 8-bit egress) to the backplane at 160 Gbps. Thus the backplane is running at one sixteenth of the pins but sixteen times faster in speed. This conversion enables the construction of a high availability backplane at a reasonable cost without thousands of connecting pins and wires. Further, because there are three fabric cards in one embodiment, there are three high-speed connectors on each linecard in one embodiment, wherein the connectors each respectively connect the 8-bit signals to a respective one of the three fabric cards. Of course, other embodiments may not require three fabric connections 710.

CPU. On every linecard there is a processor (CPU) 714, which in one embodiment is a PowerPC 750 Cxe. In one embodiment, CPU 714 connects to each PACE with a 3.2 Gb bus, via a bus controller 715 and a bridge 716. In addition, CPU 714 also connects to each PPU, CAM and TM, however, in some embodiments this connection is slower at 40 Mbps. Both the 3.2 Gb and 40 Mb paths allow the CPU to communicate with most devices in the linecard as well as to read and write the internal registers of every device on the linecard, download microcode, and send and receive control packets.

The CPU on each linecard is responsible to initialize every chip at power up and to download microcode to the SPUs and each port wherever the microcode is needed. Once the linecard is in running state, the CPU processes the control traffic. For information needed to establish a virtual target connection, the CPU requests the information from the SCC, which in turn gets the information from an appropriate object in the SCC database.

Distinction in Linecards—Ports. In one embodiment, the ports in each type of linecard, e.g., GigE, FC, or WAN are distinct as each linecard only supports one type of port. Each type of port for one embodiment is described below. Of course other linecard ports could be designed to support other protocols, such as Infiniband in other embodiments.

GigE Port. A gigabit Ethernet port connects to iSCSI servers and storage devices. While the GigE port carries all kinds of Ethernet traffic, the only network traffic generally to be processed by a storage switch 304 at wire speed in accordance with one embodiment of the invention is an iSCSI Packet Data Unit (PDU) inside a TCP/IP packet. Nonetheless, in other embodiments packets in accordance with other protocols (like Network File System (NFS)) carried over Ethernet connections may be received at the GigE Port and processed by the SPU and/or CPU.

The GigE port receives and transmits TCP/IP segments for virtual targets or iSCSI devices. To establish a TCP connection for a virtual target, both the linecard CPU 714 and the SCC 610 are involved. When a TCP packet is received, and after initial handshaking is performed, a TCP control block is created and stored in the GigE port memory 703. A VTD must also be retrieved from an object of the SCC database and stored in the CPU SDRAM 705 for the purpose of authenticating the connection and understanding the configuration of the virtual target. The TCP Control Block identifies a particular TCP session or iSCSI connection to which the packet belongs, and contains in one embodiment, TCP segment numbers, states, window size, and potentially other information about the connection. In addition, the TCP Control Block is identified by an index, referred to herein as the "TCP Control Block Index." A VTD for the connection must be created and stored in the SPU SRAM 705. The CPU creates the VTD by retrieving the VTD information stored in its SDRAM and originally obtained from the SCC database. A VTD ID is established in a list of VTD IDs in the SPU CAM 707 for quick reference to the VTD. The VTD ID is affiliated with and indexed by the TCP Control Block Index.

When the port receives iSCSI PDUs, it serves essentially as a termination point for the connection, but then the switch initiates a new connection with the target. After receiving a packet on the ingress side, the port delivers the iSCSI PDU to the PACE with a TCP Control Block Index, identifying a specific TCP connection. For a non-TCP packet or a TCP packet not containing an iSCSI PDU, the port receives and transmits the packet without acting as a termination point for the connection. Typically, the port 702 communicates with the PACE 704 that an iSCSI packet is received or sent by using a TCP Control Block Index. When the TCP Control Block Index of a packet is −1, it identifies a non-iSCSI packet.

FC Port. An FC port connects to servers and FC storage devices. The FC port appears as a fibre channel storage subsystem to the connecting servers, meaning, it presents a large pool of virtual target devices that allow the initiators (e.g., servers) to perform a Process Login (PLOGI or PRLI), as are understood in the art, to establish a connection. The FC port accepts the GID extended link services (ELSs) and returns a list of target devices available for access by that initiator (e.g., server).

When connecting to fibre channel storage devices, the port appears as a fibre channel F-port, meaning, it accepts a Fabric Login, as is known in the art, from the storage devices and provides name service functions by accepting and processing the GID requests.

At the port initialization, the linecard CPU must go through both sending Fabric Logins, Process Logins, and GIDs as well as receive the same. The SCC supports an application to convert FC ELS's to iSNS requests and responses. As a result, the same database in the SCC keeps track both the FC initiators (e.g., servers) and targets (e.g., storage devices) as if they were iSCSI initiators and targets.

When establishing an FC connection, unlike for a GigE port, an FC port does not need to create TCP control blocks or their equivalent; all the necessary information is available from the FC header. But, a VTD (indexed by a D_ID) will still need to be established in a manner similar to that described for the GigE port.

An FC port can be configured for 1 Gb or 2 Gb. As a 1 Gb port, two ports are connected to a single PACE as illustrated in FIG. 3; but in an embodiment where it is configured as a 2 Gb port, port traffic and traffic that can be accommodated by the SPU should match to avoid congestion at the SPU. The port connects to the PACE with a POS/PHY interface in one embodiment. Each port can be configured separately, i.e. one PACE may have two 1 Gb ports and another PACE has a single 2 Gb port.

WAN Ports. In embodiments that include a WAN linecard, the WAN linecard supports OC-48 and OC-192 connections in one embodiment. Accordingly, there are two types of WAN ports: OC-48 and OC-192. For OC-48, there is one port for each SPU. There is no aggregation function in the PACE, although there still is the classification function. A WAN port connects to SONET and works like a GigE port as it transmits and receives network packets such as ICMP, RIP, BPG, IP and TCP. Unlike the GigE port, a WAN port in one embodiment supports network security with VPN and IPSec that requires additional hardware components.

Since OC-192 results in a faster wire speed, a faster SPU will be required in embodiments that support OC-192.

A storage switch in accordance with an embodiment of the invention performs various switch-based storage operations, including classification of packets, virtualization, and translation. These services are generally performed by the SPU. In one embodiment, every port has an SPU, enabling the processing of data traffic as fast as possible while passing control traffic to the CPU, which has the resources to handle the control traffic. As shown in FIG. 3, four SPUs share a single CPU supporting eight ports. Thus, minimum resources and overhead are used for data traffic, allowing a large number of low cost ports each with the intelligence to process storage traffic at wire speed. Many details of the write and read process of the SPUs is described in U.S. patent application Ser. No. 10/051,396, entitled VIRTUALIZATION IN A STORAGE SYSTEM, filed Jan. 18, 2002, incorporated herein by reference in its entirety.

Mirrored Write Operations

The switch described above can perform data mirroring. A virtual target is mirrored when an identical (or almost identical) copy of the data is stored in two or more separate physical locations, often referred to as "members" of the mirrored virtual target. For example, data may be mirrored to provide a back-up of the data or to replicate the data for users at different locations. One embodiment of the invention supports mirroring over a slow link, for example, when one copy of data is on one SAN and a second copy is stored at a remote location from the SAN, e.g., on a second SAN. When a virtual target is mirrored, data written to the virtual target should be written to the different members. In one example, data may be mirrored in two different storage arrays. Each of the two storage arrays will store a copy of the virtual data structure. Anytime data is written to the virtual data structure, that same data is written to both storage arrays. In other embodiments, data can be mirrored to more than two devices. For example, a third copy of the data may be stored in a remote location for security, accessibility or other purposes. In one embodiment, when reading from the mirrored virtual storage device, the PPU selects the one member of the mirrored target that has the smallest average response time.

Figure 4B:
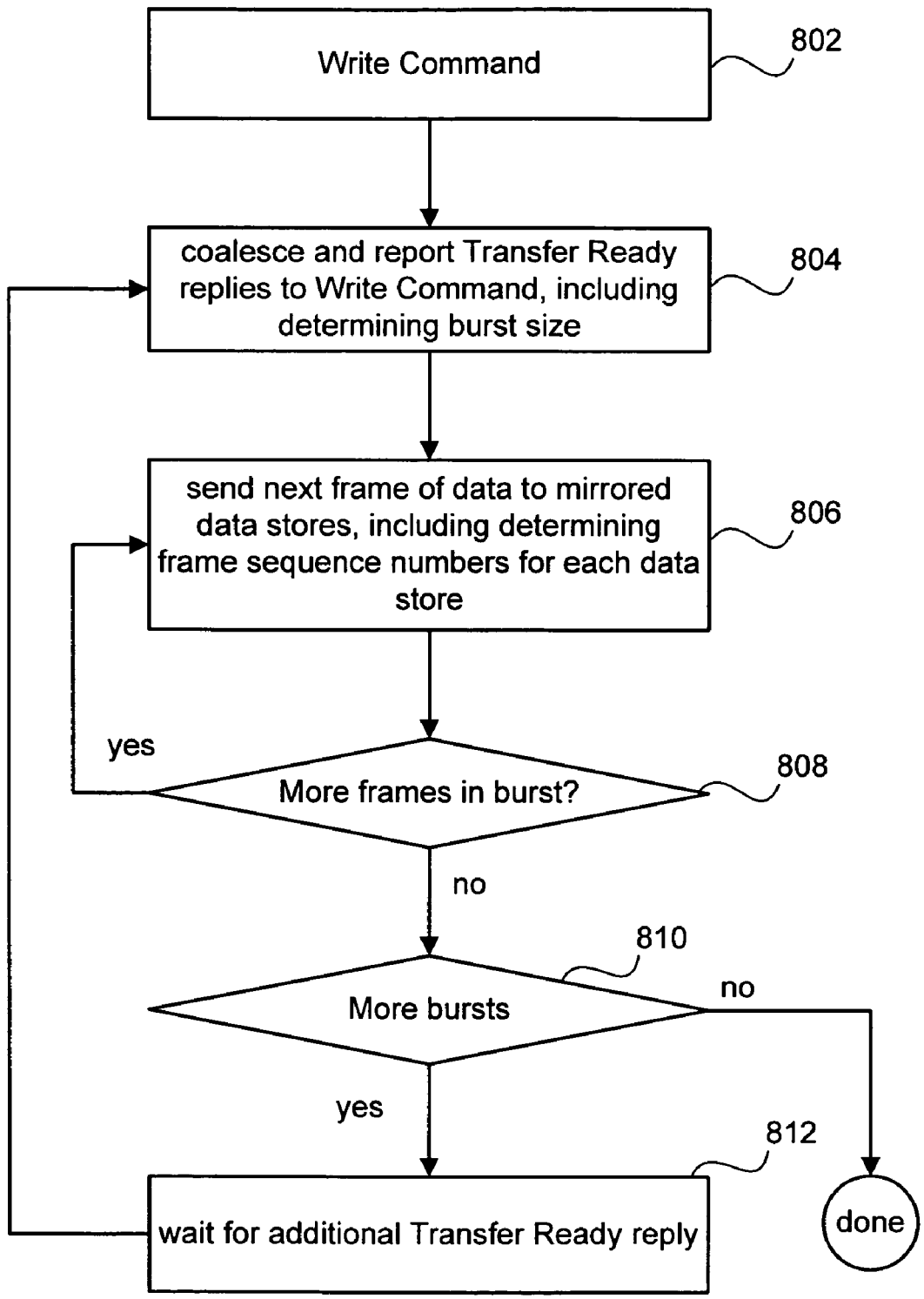
FIG. 4b is a high level flow chart describing one embodiment of a mirrored write operation.

FIG. 4B depicts a flow chart describing one embodiment of a write operation for data that is being mirrored. The process is depicted in FIG. 4B at a high level. More details will be provided below. In step 802, a Write Command is processed. Step 802 includes an initiator issuing a Write Command and that Write Command being communicated to the various data stores that are storing the various copies of the data. When those data stores are ready to accept the data, they will issue a Transfer Read reply. The Transfer Ready reply indicates that the particular data store is ready to receive a certain specified amount of data.

One issue that arises is that the various data stores may not be homogenous. That is, they can be configured differently, in different states, running different software, utilizing different hardware or otherwise acting differently such that the different data stores will specify in the Transfer Ready replies that they are available to receive different amount of data. The amount of data a particular member is ready to receive is called the burst size. For example, a first data store may be ready to receive a 2K block of data, while a second data store is ready to receive a 3K block of data. If the switch cached the write data, the disparity between the different data stores can be easily handled. However, the use of such a data cache causes a performance penalty. Furthermore, it is difficult to preserve the cache across power failures and the cache adds more points of failure to the switch. Instead of using an internal data cache, the switch will coalesce the various Transfer Ready replies in step 804. In one embodiment, the ingress PPU that received the original Write Command waits until every member has returned a Transfer Ready reply. Once all members have responded, then the PPU will prepare to send the initiator the a single Transfer Ready reply that specifies the smallest burst size of the received Transfer Ready replies.

In step 806, in response to the Transfer Ready reply it received, the initiator sends a frame of data that is forwarded to all mirrored members. As part of the process of sending the data to each member, a sequence count is determined for each member. That is, because different members expect different burst sizes, the frame number within a given burst for a particular member may need to be different. More details of how sequence counts are determined is described below. Step 806 is repeated until all of the frames in the current burst have been sent (see step 808). If there are no more bursts to send (step 810), then the process of FIG. 4B is completed. If there are bursts of data to be sent, then the ingress PPU waits for the member(s) that asked for the smallest burst size to send another Transfer Ready reply (step 812). Then the PPU returns another Transfer Ready reply to the Initiator in step 804 and the method continues with step 806. The process continues until all of the members have stored all the required data. An example is shown in Table below:

|  | Member 1 | Member 2 | To initiator |
|---|---|---|---|
| Total Data to be written (and mirrored) | 4k | 4k |  |
| Size specified in first Transfer Ready reply | 2k | 3k |  |
| PPU requests from initiator |  |  | 2k |
| Unsatisfied Transfer Ready (after 2k written) | 0k | 1k |  |
| Size specified in second Transfer Ready from Member 1 | 2k |  |  |
| PPU requests from initiator |  |  | 1k |
| Unsatisfied Transfer Ready (after 1k written) | 1k | 0k |  |
| Size specified in third Transfer Ready from Member 2 in step 812 |  | 1k |  |
| PPU requests from initiator |  |  | 1k |
| Unsatisfied R2T or XFR_RDY (after 1k written) | 0k | 0k |  |

Protocol Formats

The switch of the present invention can use any one of a set of suitable protocols to perform a mirrored write process. Two examples of suitable protocols include iSCSI and FC.

Before describing the details of how the switch performs the mirrored write process, a brief overview of iSCSI PDU's (Packet Data Units) and FC IUs (Information Units) will be useful. Nonetheless, a general knowledge of the iSCSI and FC protocols is assumed. For more information on iSCSI refer to "draft-ietf-ips-iSCSI-20.txt," an Internet Draft (see www.ietf.org) and work in progress by the Internet Engineering Task Force (IETF), Jan. 19, 2003, incorporated herein by reference in its entirety. For more information about Fibre Channel (FC) refer to "SCSI Fibre Channel Protocol-2 (FCP-2)", Nov. 23, 2002, Rev: 08 (www.t10.org), incorporated herein by reference in its entirety.

iSCSI Command PDU

An iSCSI Command PDU is shown in FIG. 5a. As shown it includes 48 bytes having the following fields. In the first byte (Byte 0), the X bit is used as a Retry/Restart indicator for PDUs from initiator to target. The I bit is used as an immediate delivery marker. The Opcode 0x01 indicates that the type of iSCSI PDU is a command. Byte 1 has a number of flags, F (final), R (read), and W (write). Byte 1 also has a task attribute field ATTR, which is usually 3 bits. CRN in Byte 3 is a SCSI command reference number. TotalAHSLength represents the total length of any additional optional header segments (not shown) in 4 byte words. DataSegmentLength indicates the length of the payload. LUN specifies a logical unit number. The Initiator Task Tag identifies a task tag assigned by the initiator (e.g., a server) to identify the task. Expected Data Transfer Length states the number of bytes of data to be transferred to or from the initiator for the operation. CmdSN is a command sequence number. ExpStatSN is an expected status sequence number and ExpDataSN is an expected data sequence number. The Command Descriptor block (CDB) is generally 16 bytes and embodies the SCSI command itself.

iSCSI R2T PDU

An iSCSI R2T PDU is shown in FIG. 5b. In byte 0, 0x31 identifies the packet as an R2T packet. The Initiator Task Tag is the same as for the Command PDU. The Target Transfer Tag is assigned by the target (e.g., a storage device) and enables identification of data packets. The StatSN field contains a status sequence number. ExpCmdSN identifies the next expected CmdSN from the initiator and MaxCmdSN identifies the maximum CmdSN acceptable from the initiator. R2TSN identifies the R2T PDU number. Desired Data Transfer Length specifies how many bytes the target wants the initiator to send (the target may request the data in several chunks). The target, therefore, also specifies a Buffer Offset that indicates the point at which the data transfer should begin.

iSCSI Write and Read Data PDUs

An iSCSI Write Data PDU is shown in FIG. 5c. An iSCSI Read Data PDU is shown in FIG. 5d. In byte 0, 0x05 identifies the packet as a write packet and 0x25 identifies the packet as a read packet. Most of the fields in these PDUs are the same as for those PDUs described above. In addition, the DataSN identifies a data sequence number and Residual Count identifies how many bytes were not transferred out of those expected to be transferred, for instance if the initiator's Expected Data Transfer Length was too small.

iSCSI Response PDU

An iSCSI Response PDU is shown in FIG. 5e. In Byte 0, 0x21 identifies the packet as a response packet. The Status field is used to report the SCSI status of the command. The response field contains an iSCSI service response code that identifies that the command is completed or that there has been an error or failure. Basic Residual Count identifies how many bytes were not transferred out of those expected to be transferred, for instance if the initiator's Expected Data Transfer Length was too small. Bidi_Read Residual Count indicates how many bytes were not transferred to the initiator out of those expected to be transferred. Other fields are the same as those discussed previously for other PDUs.

FCP Frame Header

Each FCP Information Unit (IU) uses the Frame Header shown in FIG. 5f and which will be followed by a payload, described below. The R_CTL field identifies the frame as part of an FC operation and identifies the information category. D_ID identifies the destination of the frame. S_ID identifies the source of the frame. TYPE is generally set to 0x08 for all frames of SCSI FCP sequences. F_CTL manages the beginning and normal or abnormal termination of sequences and exchanges. SEQ_ID identifies each sequence between a particular exchange originator and exchange responder with a unique value. DF_CTL indicates any optional headers that may be present. SEQ_CNT indicates the frame order within the sequence. The OX_ID field is the originator (initiator) identification of the exchange. The RX_ID field is the responder (target) identification of the exchange. The RLTV_OFF field indicates the relative displacement of the first byte of each frame's payload with reference to the base address of the information category.

FCP_CMND Payload

The payload for a FCP command IU is shown in FIG. 5g. FCP_LUN is a logical unit number. FCP_CNTL is a control field that contains a number of control flags and bits. FCP_CDB contains the actual SCSI CDB to be interpreted by the addressed logical unit. FCP_DL contains a count of the greatest number of data bytes expected to be transferred to or from the target.

FCP XFR RDY Payload

The payload for an FCP XFR_RDY IU is shown in FIG. 5h. The DATA_RO field indicates the contents of the RLTV_OFF field for the first data byte of the next FCP_DATA IU. The BURST_LEN field indicates the amount of buffer space prepared for the next FCP_DATA IU and requests the transfer of an IU of that exact length.

FCP Data IU

The payload for a data IU is the actual data transferred.

FCP_RSP_IU

The payload for an FCP response IU is shown in FIG. 5i. The FCP_STATUS field is set to 0 upon the successful completion of a command task. Otherwise it indicates various status conditions. The FCP_RESID field contains a count of the number of residual data bytes which were not transferred in the FCP_DATA IU for this SCSI command. FCP SNS_LEN specifies the number of bytes in the FCP_SNS_INFO field. FCP_RSP_LEN specifies the number of bytes in the FCP_RSP_INFO field. The FCP_RSP_INFO field contains information describing any protocol failures detected. The FCP_SNS_INFO field contains any sense data present.

The details of each iSCSI PDU and FC IU have been only generally described. Further details regarding iSCSI PDUs, FC IUs, and their respective fields can be found in the iSCSI and FC documents referenced above.

Classification for Storage Switch

As packets or frames (generically referred to herein as "packets") arrive at the storage switch they are separated at each port into data and control traffic. Data traffic is routed to the PPU for wire-speed virtualization and translation, while control traffic such as connection requests or storage management requests are routed to the CPU. This separation is referred to herein as "packet classification" or just "classification" and is generally initiated in the PACE of the SPU. Accordingly, unlike the existing art, which forwards all packets to the CPU for processing, a system in accordance with the invention recognizes the packet contents, so that data traffic can be processed separately and faster, aiding in enabling wire-speed processing. GigE packets and FC frames are handled slightly differently, as described below.

For packets arriving at a GigE port in the ingress direction (packets arriving at the switch), the following steps will be described with reference to FIG. 6. A GigE port will receive a packet, which in one embodiment is either an IP packet or an iSCSI packet, step 902. Once the packet is received, the PACE determines if a virtual target access is recognized by whether it receives from the port a valid TCP Control Block Index with the packet (e.g., an index that is not −1), step 904. If there is a valid TCP Control Block Index, the PACE next checks the flags of the packet's TCP header, step 906. If the SYN, FIN, and RST flags of the TCP header are set, the packet is forwarded to the CPU, step 916, as the CPU would be responsible to establish and terminate a TCP session. Once an iSCSI TCP session is established, for managing the TCP session, the GigE port will receive a valid TCP control block from the CPU. But if the flags are not set, then in one embodiment the PACE will remove the TCP, IP, and MAC headers, step 908, leaving the iSCSI header, and then add a local header, step 910. Other embodiments, however, may leave the TCP, IP and MAC headers, and simply add a local header. Once the local header is added, the packet is sent to the PPU, step 912.

Figure 8:
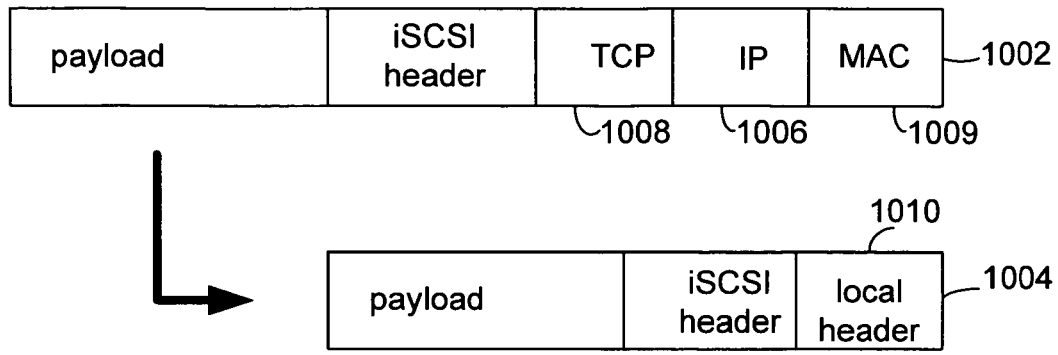
FIGS. 8 and 9 illustrate block diagrams of TCP packets as they enter a storage switch in accordance with the invention and how the packets are modified for use within the storage switch.
Figure 9:
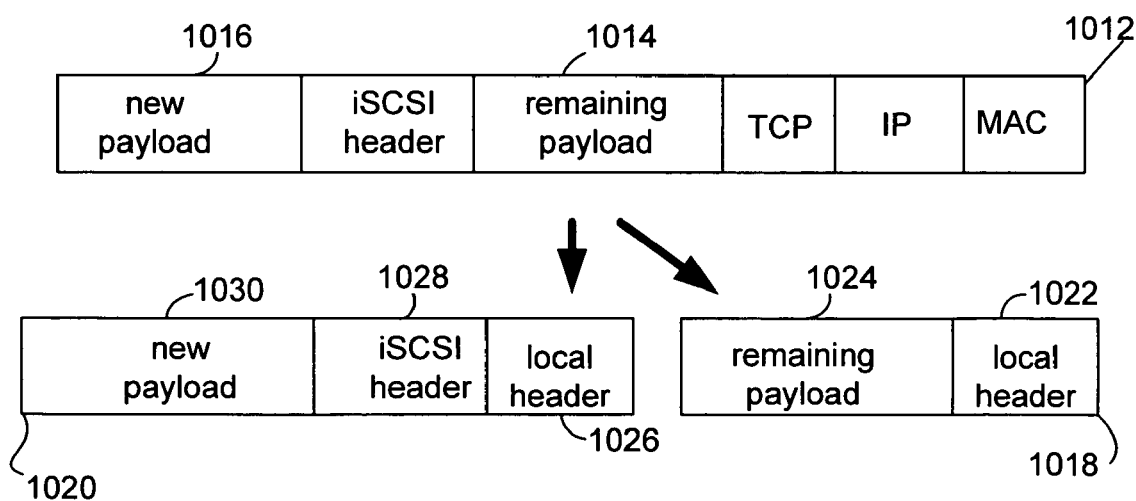

Referring additionally to FIG. 8, if step 910 is performed, the received TCP packet 1002 would be converted to a local packet 1004, having the IP, TCP, and MAC headers 1006, 1008, 1009 removed (in one embodiment) and a local header 1010 added. In some cases, however, the payload for an iSCSI packet may be split over two TCP/IP packets. Thus, referring to FIG. 9, sometimes a received TCP packet 1012 includes a second portion 1014 of a payload, where the first part of the payload was sent in a previous packet. The packet containing the second portion of the payload may additionally contain a new independent payload 1016. The received packet 1012 would be divided into two local packets, 1018 and 1020. Local packet 1018 includes a local header 1022 and the second portion of the payload 1024 from a previous packet, but not an iSCSI header. Local packet 1020 includes the local header 1026, the iSCSI header 1028, and the new payload 1030.

An example local header 1100 used in one embodiment is shown in FIG. 10. The local header 1100 includes the following fields in one embodiment. A VTD ID field is used to identify a VTD for a particular connection. A FlowID specifies the destination port for a packet. A TCP Control Block Index specifies a TCP control block for a particular connection (if a TCP connection). The Type field specifies the packet classification, e.g., data or control. The Size field indicates the packet size. The Task Index is used to track and direct the packet within the switch as well as to locate stored information related to the packet for the particular task. The local header further includes some hardware identifiers such as source identifiers (e.g., identifying a source port, PACE, linecard, and/or CPU) and destination identifiers (e.g., identifying a distinction Port, PACE linecard, and/or CPU).

The local header is used by various devices (e.g., PACE, PPU) throughout the switch. Accordingly, in some instances not all fields of the local header will be fully populated and in some instances the field contents may be changed or updated.

Referring again to FIG. 6, in the event that there is no valid TCP Control Block Index, step 904, then it is determined if the packet is an IP packet, step 914. If the packet is not an IP packet, it is forwarded to the CPU, step 916. If the packet is an IP packet, then the PACE checks the destination IP address, step 918. If the IP address matches that of the port of the storage switch, the packet is sent to the CPU, step 916, for processing. If the IP address does not match that of the port of the storage switch, then it is routing traffic and is forwarded to the PPU, step 912.

Referring to FIG. 7, when a packet destined for a GigE port is received in the egress direction by the PACE from an PPU or CPU, step 950, the PACE removes the local header, step 952. If the packet is for a TCP session, step 954, the PACE sets a control flag in its interface with the port to so inform the GigE port, step 956. If the packet is for a TCP session, the PACE passes the packet and the TCP Control Block Index to the port using interface control signals, step 958. If there is no TCP session, the packet is simply passed to the port, step 960.

Figure 11:
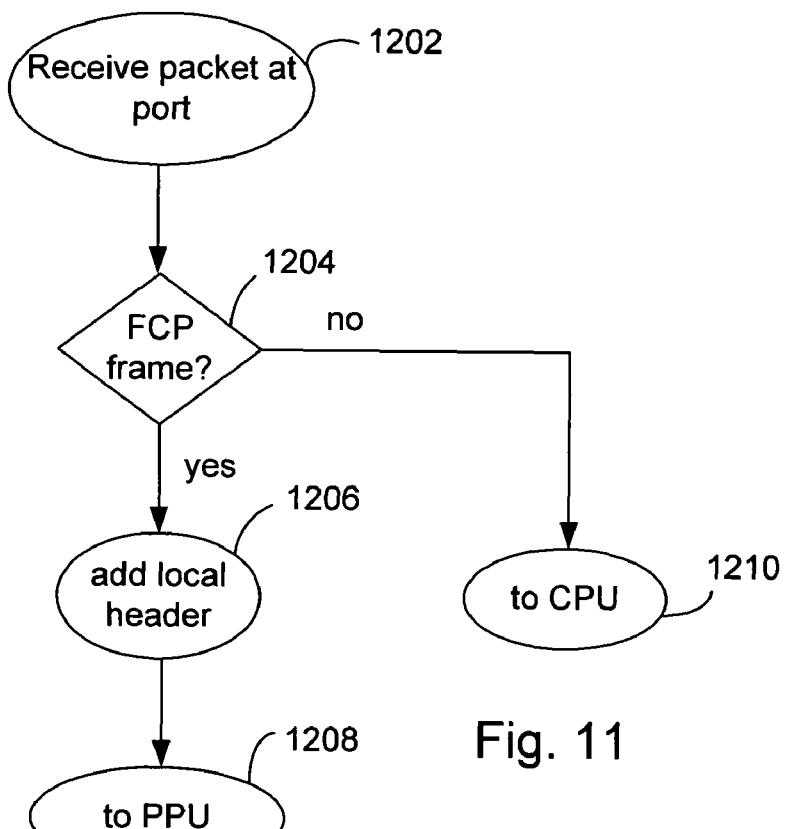
FIG. 11 is a flow diagram illustrating a classification process of FCP frames in the ingress direction as the process occurs in the PACE, in accordance with an embodiment of the invention.

FIG. 11 illustrates the steps that occur at the PACE in classifying packets that arrive from an FC port. Unlike for a GigE port, the PACE for an FC port does not have to deal with a TCP Control Block Index. Instead, upon receiving a packet at an FC port, step 1202, the S_ID field of the FCP frame header can be consulted to determine if the frame belongs to an open FC connection, however, this step is performed after the packet is passed to the PPU. Thus, the PACE only need determine if the frame is an FCP frame, step 1204, which can be determined by consulting the R_CTL and TYPE fields of the frame header. A local header 1100 (FIG. 10) is added, step 1206, although the FCP frame header is not removed at this point as the data in the header will be useful to the PPU later. The local packet is then passed to the PPU, step 1208. If the frame is not an FCP frame, it is passed to the CPU, step 1210.

Figure 12:
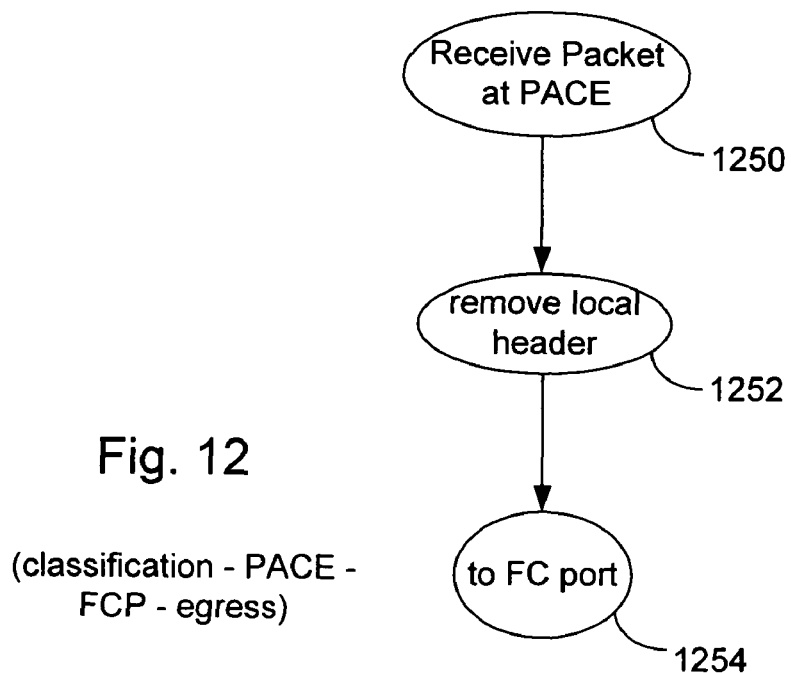
FIG. 12 is a flow diagram illustrating a classification process of FCP frames as in the egress direction as the process occurs in the PACE, in accordance with an embodiment of the invention.

Referring to FIG. 12, when a packet destined for an FC port is received in the egress direction by the PACE from an PPU or CPU, step 1250, the PACE simply removes the local header, step 1252, before passing the frame to the FC port, step 1254. The local header will indicate to the PACE which port (of the two ports the PACE is connected to) the packet is destined for.

Figure 13A:
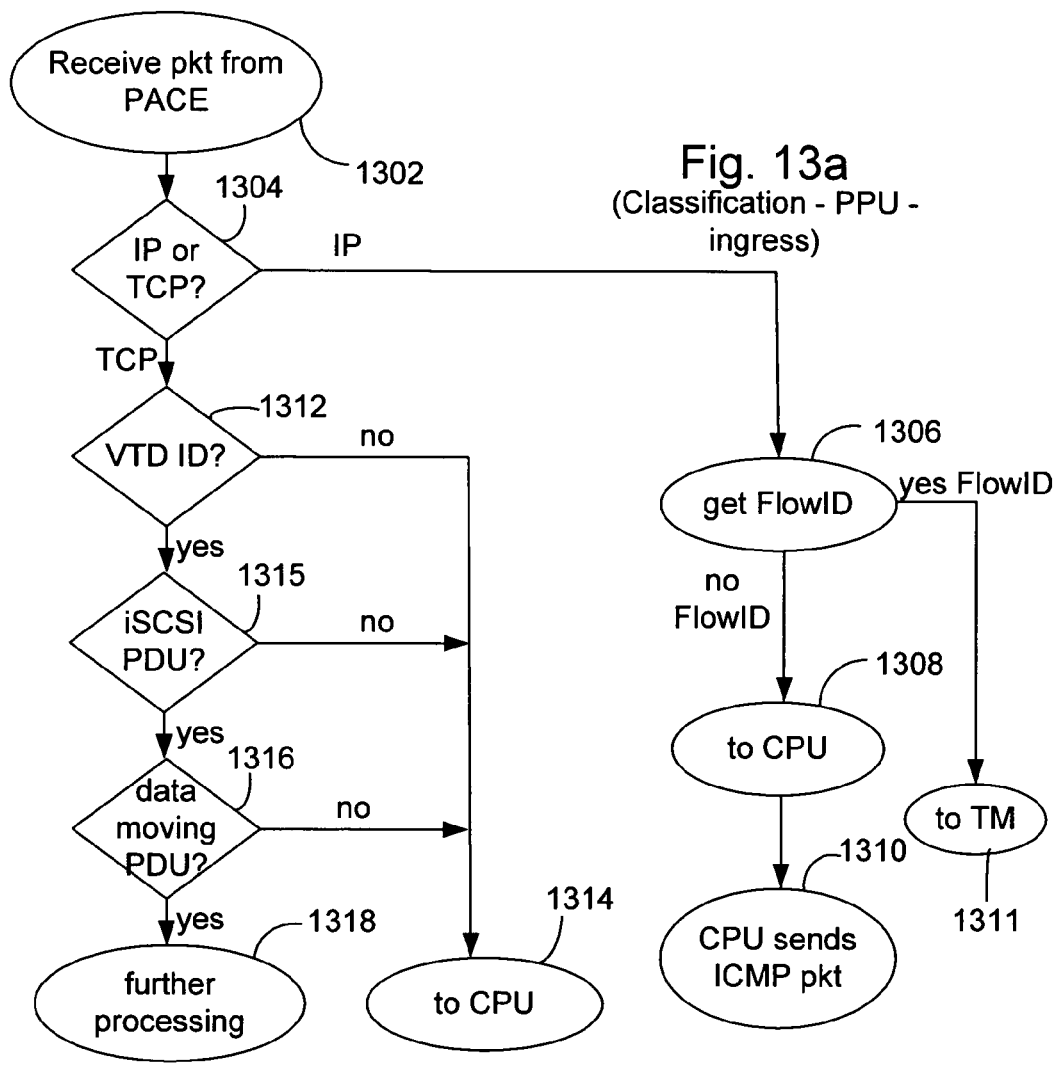
FIG. 13a is a flow diagram illustrating a classification process in the ingress direction as the process occurs in the PPU, in accordance with an embodiment of the invention.

For packets received at either a GigE or FC port and that are passed to the PPU, the PPU further separates control traffic in one embodiment. Referring to FIG. 13a, when the PPU receives a packet from the PACE, step 1302, the PPU determines if it is an IP or TCP packet, step 1304. If the packet is an IP packet, the PPU searches its CAM to obtain the FlowID of the packet from its route table, step 1306. If the search fails, the packet has an unknown destination IP address, and it is passed to the CPU, step 1308, which in turn sends an ICMP packet back to the source IP address step 1310. If the search returns a FlowID, then the packet is forwarded to the Traffic Manager, step 1311.

When the packet received is a TCP packet, step 1304, the PPU searches its CAM using the TCP Control Block Index, which identifies the TCP session, together with the LUN from the iSCSI header, which identifies the virtual target, to get a virtual target descriptor ID (VTD ID), step 1312. The VTD ID's are essentially addresses or pointers to the VTDs stored in the PPU SRAM. The PPU uses the VTD ID to obtain the address of the VTD, step 1312, so a search of VTD ID's allows the ability to quickly locate a VTD. If the VTD cannot be obtained, then the iSCSI session has not yet been established, and the packet is sent to the CPU, step 1314. But if the VTD ID is obtained in step 1312, the PPU determines if the packet contains an iSCSI PDU, step 1315. If the packet does not contain an iSCSI PDU, it is forwarded to the CPU, step 1314. But if it does include an iSCSI PDU, the PPU determines if the PDU is a data moving PDU (e.g., read or write command, R2T, write data, read data, response), step 1316. If the PDU is not a data moving PDU, then the packet is passed to the CPU, step 1314. But if the PDU is a data moving PDU, then the PPU performs further processing on the packet, step 1318, e.g., virtualization and translation, as will be described later.

When the PPU receives an FCP frame with an FCP command IU in the ingress direction, the PPU performs similar steps to those described in FIG. 13a, steps 1302, 1312-1318, except that the CAM search in step 1312 uses the S_ID address and the LUN from the FCP frame to find the VTD ID.

Figure 13B:
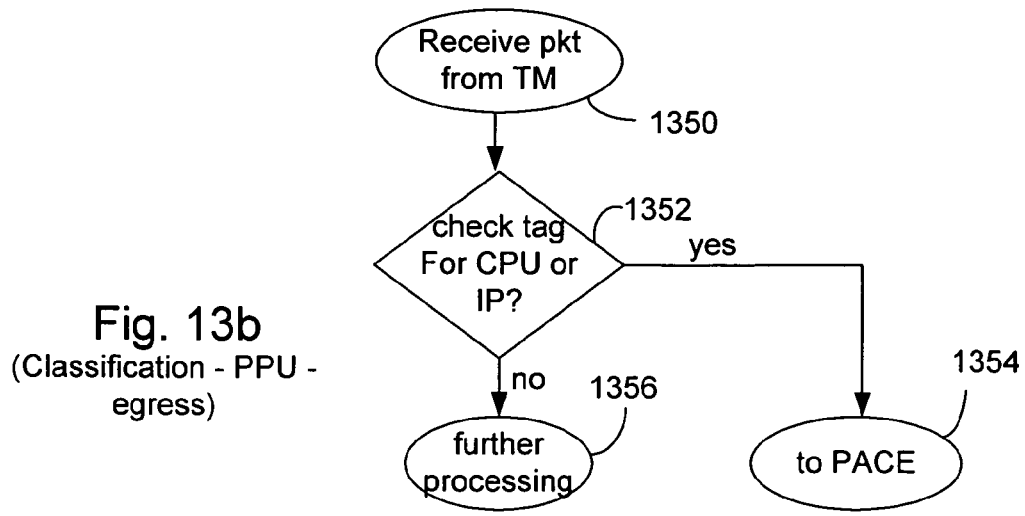
FIG. 13b is a flow diagram illustrating a classification process in the egress direction as the process occurs in the PPU, in accordance with an embodiment of the invention.

In the egress direction, shown in FIG. 13b, after receiving a packet from the traffic manager, step 1350, the PPU checks the Type field of the local header, step 1352. If the field indicates that the packet is an IP packet or a packet destined for the CPU, then the PPU sends the packet to the PACE, step 1354. Otherwise, the PPU performs further processing on the packet, step 1356, e.g., virtualization and translation, as will be described later.

As described above, the CPU will be passed packets from the SPU in several situations. These situations include:

1. A non-TCP packet having the storage switch as its destination. Such a packet could be an ICMP, IP, RIP, BGP, or ARP packet, as are understood in the art. The CPU performs the inter-switch communication and IP routing function. The packet may also be SLP or iSNS requests that will be forwarded to the SCC.

2. An IP packet without a CAM match to a proper routing destination. While this situation will not frequently occur, if it does, the CPU returns an ICMP packet to the source IP address.

3. A non-iSCSI TCP packet. Such a packet would generally be for the CPU to establish or terminate a TCP session for iSCSI and will typically be packets with SYN, FIN, or RST flags set.

4. A non-FCP FC frame. Such frames are FLOGI, PLOGI, and other FCP requests for name services. Similar to iSCSI TCP session, these frames allow the CPU to recognize and to communicate with the FC devices. In one embodiment, the CPU needs to communicate with the SCC to complete the services.

5. An iSCSI PDU that is not a SCSI command, response, or data. Such a packet may be a ping, login, logout, or task management. Additional iSCSI communication is generally required before a full session is established. The CPU will need information from the SCC database to complete the login.

6. An iSCSI command PDU with a SCSI command that is not Read/Write/Verify. These commands are iSCSI control commands to be processed by the CPU where the virtual target behavior is implemented.

7. An FCP frame with a SCSI command that is not Read/Write/Verify. These commands are FCP control commands to be processed by the CPU where the virtual target behavior is implemented.

Operation

After the packet is classified, as described above, the PPU performs wire-speed virtualization and does so, in one embodiment, without data buffering. For each packet received, the PPU determines the type of packet (e.g., command, R2T/XFR_RDY, Write Data, Read Data, Response, Task Management/Abort) and then performs either an ingress (where the packet enters the switch) or an egress (where the packet leaves the switch) algorithm to translate the virtual target to a physical target or vice versa. Thus, the virtualization function is distributed amongst ingress and egress ports. To further enable wire-speed processing, virtual descriptors are used in conjunction with a CAM, to map the request location to the access location. In addition, for each packet there may be special considerations. For instance, the virtual target to which the packet is destined may be spaced over several noncontiguous extents and be mirrored. The ingress and egress process for each packet type is described below. However, generally, the ingress process for each packet validates the virtual target, determines the egress port to send the packet to, and leaves trace tags so responsive packets can be tracked. The egress process generally continues to maintain trace tags and makes adjustments to the block addresses to translate from the virtual world to the physical one.

FIGS. 14, 14A, 15 and 15A provide details of the Write Command Process (see step 802 of FIG. 4B).

Command Packet—Ingress

Figure 14:
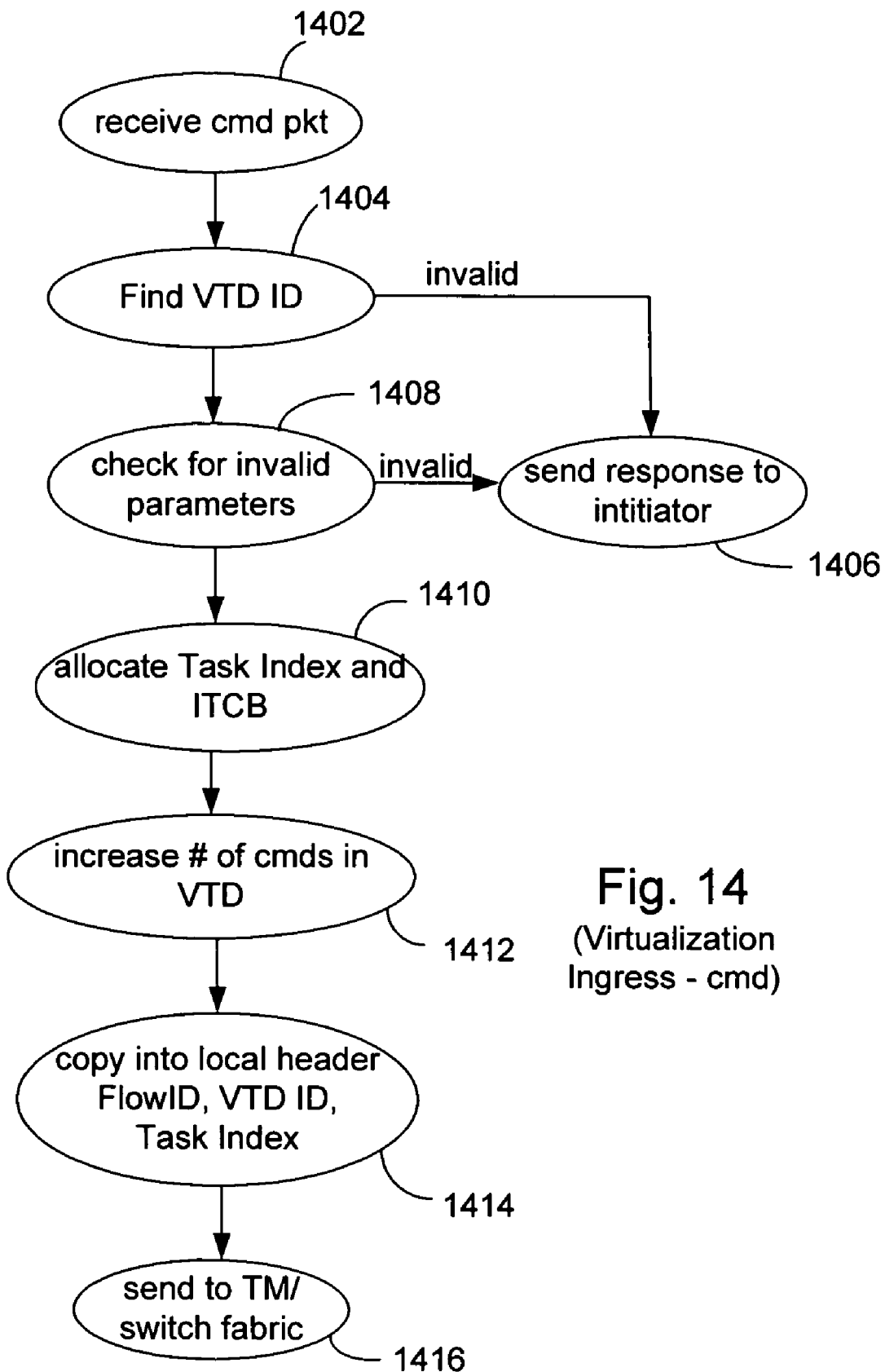
FIG. 14 is a flow diagram illustrating a virtualization process in the ingress direction for command packets or frames, in accordance with an embodiment of the invention.

To initiate a transfer task to or from the virtual target, a SCSI command is sent by an iSCSI or FC initiator in an iSCSI PDU or FCP IU, respectively. Referring to FIGS. 14 and 14a, when such a packet is received at the PPU (after classification), step 1402, the PPU CAM is next checked to determine if a valid VTD ID exists, using the TCP Control Block Index and the logical unit number (LUN), in the case of an iSCSI initiator, or the S_ID and the LUN, in the case of an FC initiator, step 1404. The LUNs in each case are found in the respective iSCSI PDU or FCP IU. If no valid VTD ID is found, then a response packet is sent back to the initiator, step 1406. If a valid VTD is found, then a check is made for invalid parameters, step 1408. Such checks may include checking to determine if the number of outstanding commands for the virtual target has exceeded a maximum allowable number or if the blocks requested to be accessed are in an allowable range. If invalid parameters exists, a response packet is sent back to the iSCSI or FC initiator, step 1406.

If all parameters checked are valid, then a Task Index is allocated along with an Ingress Task Control Block (ITCB), step 1410 and shown in FIG. 14a. The Task Index points to or identifies the ITCB. The ITCB stores the FlowID (obtained from the VTD), the VTD ID, CmdSN (from the iSCSI packet itself), as well as the initiator_task_tag sent in the iSCSI PDU or the OX_ID in the FCP frame header. The ITCB is stored in the PPU SRAM. Of course there may be many commands in progress at any given time, so the PPU may store a number of ITCBs at any particular time. Each ITCB will be referenced by its respective Task Index.

The FlowID tells the traffic manager the destination linecards and ports. When data is being mirrored, the switch is configured such that a particular FlowID is created for the group of members storing the mirrored data. For example, if two copies of data are being stored, one copy is stored on device A and another copy stored on device B, a FlowID (e.g., FlowID Q) is created that points to the linecard/port for device A and the linecard/port for device B. Thus, a message sent to FlowID Q will be sent to the linecard/port for device A and the linecard/port for device B.

The VTD tracks the number of outstanding commands to a particular virtual target, so when a new ITCB is established, it must increment the number of outstanding commands, step 1412. In some embodiments, VTDs establish a maximum number of commands that may be outstanding to any one particular virtual target. The FlowID, the VTD ID, and the Task Index are all copied into the local header, step 1414. Later, the Task Index will be returned by the egress port to identify a particular task of a packet. Finally, the packet is sent to the traffic manager and then the routing fabric, so that it ultimately reaches the egress PPUs associated with the FlowID, step 1416.

When a virtual target is composed of multiple extents, then there will be multiple FlowIDs identified in the VTD, one for each extent. The PPU checks the block address for the packet and then selects the correct FlowID. For example, if a virtual target has two 1 Gb extents, and the block address for the command is in the second extent, then the PPU selects the FlowID for the second extent. In other words, the FlowID determines the destination/egress port. If a read command crosses an extent boundary, meaning that the command specifies a starting block address in a first extent and an ending block address in a second extent, then after reading the appropriate data from the first extent, the PPU repeats the command to the second extent to read the remaining blocks. For a write command that crosses an extent boundary, the PPU duplicates the command to both extents and manages the order of the write data. When a read command crosses an extent boundary, there will be two read commands to two extents. The second read command is sent only after completing the first to ensure the data are returned sequentially to the initiator.

Note that in reference to FIG. 14a, not all fields in the local header and ITCB are necessarily illustrated.

Command Packet—Egress

Figure 15:
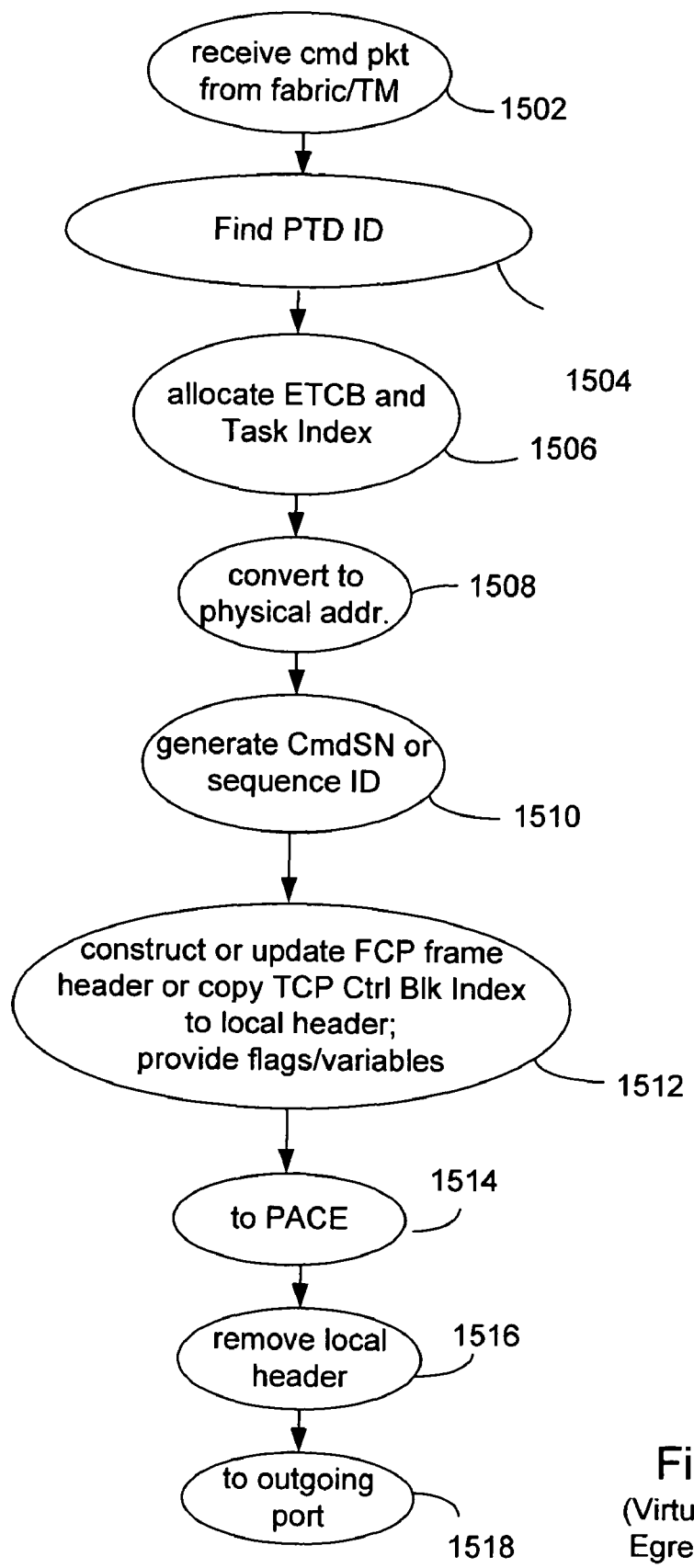
FIG. 15 is a flow diagram illustrating a virtualization process in the egress direction for command packets or frames, in accordance with an embodiment of the invention.

Referring to FIGS. 15 and 15a, after the command PDU or IU has passed through the switch fabric, it will arrive at the PPUs for each physical device storing a copy of the data in step 1502. The PPU then attempts to identify the physical device(s) that the packet is destined for, step 1504. To do so, the VTD ID from the local header is used to search the PPU CAM for a PTD ID (Physical Target Descriptor Identifier): The VTD ID is affiliated with and indexes a particular PTD ID associated with the particular egress PPU. PTDs are stored in the PPU SRAM, like VTDs, and also contain information similar to that found in a VTD. If the search is unsuccessful, it is assumed that this is a command packet sent directly by the CPU and no additional processing is required by the PPU, causing the PPU to pass the packet to the proper egress port based on the FlowID in the local header. If the search is successful, the PTD ID will identify the physical target (including extent) to which the virtual target is mapped and which is in communication with the particular egress linecard currently processing the packet.

The PPU next allocates a Task Index together with an egress task control block (ETCB), step 1506, and shown in FIG. 15a. In an embodiment, the Task Index used for egress is the same as that used for ingress. The Task Index also identifies the ETCB. In addition, the ETCB also stores any other control information necessary for the command, including CmdSN of an iSCSI PDU or an exchange sequence for an FCP IU.

Next, using the contents of the PTD, the PPU converts the SCSI block address from a virtual target to the block address of a physical device, step 1508. Adding the block address of the virtual target to the beginning block offset of the extent can provide this conversion. For instance, if the virtual target block sought to be accessed is 1990 and the starting offset of the corresponding first extent is 3000, then the block address of the extent to be accessed is 4990. Next the PPU generates proper iSCSI CmdSN or FCP sequence ID, step 1510 and places them in the iSCSI PDU or FCP frame header. The PPU also constructs the FCP frame header if necessary (in some embodiments, after the ingress PPU reads the necessary information from the FCP header, it will remove it, although other embodiments will leave it intact and merely update or change the necessary fields at this step) or for a packet being sent to an iSCSI target, the TCP Control Block Index is copied into the local header from the PTD, step 1512. In addition, the PPU provides any flags or other variables needed for the iSCSI or FCP headers. The completed iSCSI PDU or FCP frame are then sent to the PACE, step 1514, which in turn strips the local header, step 1516, and passes the packet to appropriate port, step 1518.

For a virtual target of multiple extents, each extent has a different starting offset. So when a command must be split between two extents, the PPU must determine the proper address. For instance, assume a virtual target includes two extents defined in the following Table:

| Extent | 1 | 2 |
| --- | --- | --- |
| Starting offset | 3000 | 5000 |
| Size in blocks | 2000 | 2500 |

If it is desired to access the virtual target starting at address 1990 for 30 blocks, then the PPU for the first extent sends the command to address 4990 for 10 blocks (5120 bytes of data—in one embodiment a block is 512 bytes). The PPU for the second extent sends the command to address 5000 for 20 blocks (10,240 bytes of data). In other words, the PPU for the first extent must add the address to be accessed to the starting offset of the first extent (3000+1990) and then subtract that address from its total size (2000–1990) to determine how many blocks it can access. The PPU for the second extent will start at its starting offset (5000) and add the remaining blocks (20) from there (5000-5019). As a further example, if it was desired to access virtual block 2020, the PPU for the second extent would subtract the size of the first extent (2000), before adding the offset for the second extent (5000), to achieve the resulting address 5020.

R2T or XFR_RDY—Ingress

Figure 16:
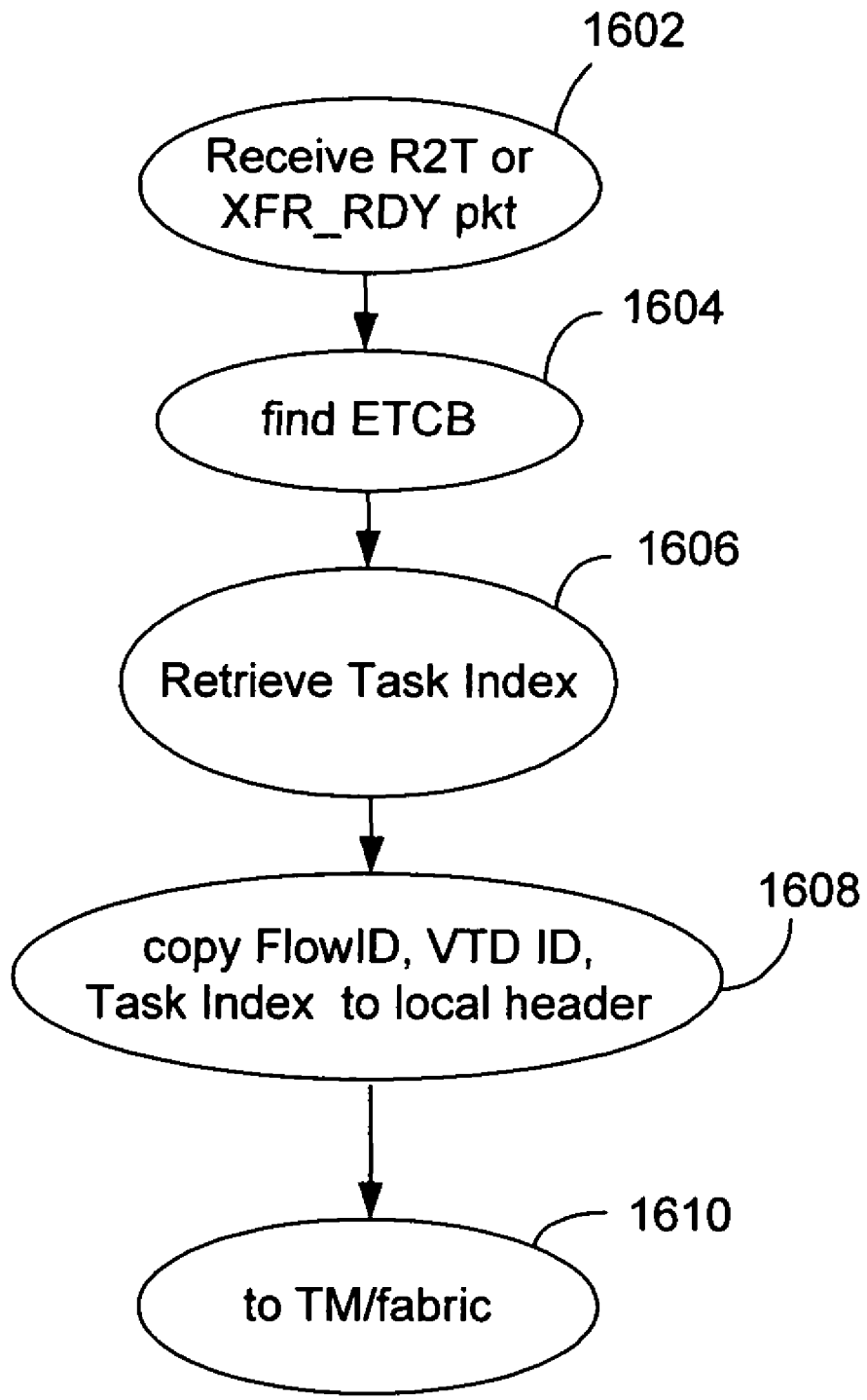
FIG. 16 is a flow diagram illustrating a virtualization process in the ingress direction for R2T/XFR_RDY packets or frames, in accordance with an embodiment of the invention.

FIGS. 16, 16A, 17 and 17A provide details of the process for receiving and coalescing Transfer Ready replies (see step 804 of FIG. 4B). Referring to FIG. 16 and 16a, after a command has been sent to a target storage device as described above, and the command is a write command, an R2T PDU or an XFR_RDY IU will be received from a storage device when it is ready to accept write data, step 1602. The PPU identifies the corresponding ETCB, step 1604, by using the initiator_task_tag or OX_ID inside the packet. In some embodiments, the initiator_task_tag or OX_ID of the packet is the same as the Task Index, which identifies the ETCB. If the PPU cannot identify a valid ETCB because of an invalid initiator_task_tag or OX_ID, the packet is discarded. Otherwise, once the ETCB is identified, the PPU stores the burst size (Burst) in the ETCB. For iSCSI, the burst size is the Desired Data Length field of the R2T PDU. For FC, the burst size is the BURST_LEN field of the XFR_RDY IU. The PPU retrieves the Ingress Task Index (if different from the Egress Task Index) and the VTD ID from the ETCB, step 1606. The PPU also retrieves the FlowID from the PTD, which is also identified in the ETCB by the PTD ID. The FlowID indicates to the traffic manager the linecard of the original initiator (ingress) port. The FlowID, the VTD ID, and the Task Index are copied into the local header of the packet, step 1608. Finally the packet is sent to the traffic manager and the switch fabric, step 1610.

R2T or XFR_RDY—Egress

After the multiple R2T or XFR_RDY packets from the mirrored storage devices emerge from the switch fabric, they are received by a PPU, step 1702, on its way to be passed back to the initiator (the device that initiated the original command for the particular task). In one embodiment, the PPU will wait to receive the R2T or XFR_RDY packets from each of the mirrored storage devices (each of the members). The Task Index identifies the ITCB to the PPU, step 1704, from which ITCB the original initiator_task_tag and the VTD ID can be obtained. The Burst sizes (Burst0, Burst1, Burst 2, . . . ), obtained from Desired Data Transfer Length or BURST_LEN fields for each of the R2T or XFR_RDY packets, are stored in the ITCB, in step 1706. Additionally, the PPU creates a new transfer ready reply packet. The burst size returned in the new packet is the smallest burst size of the various transfer ready replies. The local header of the new packet is updated with the FCP D_ID or the TCP Control Block Index for the TCP connection, step 1708. Note that the stored S_ID from the original packet, which is stored in the ITCB, becomes the D_ID. If necessary an FCP frame header is constructed or its fields are updated, step 1710. The destination port number is specified in the local header in place of the FlowID, step 1712, and placed along with the initiator_task_tag in the SCSI PDU or, for an FC connection, the RX_ID and OX_ID are placed in the FCP frame. The PPU also places any other flags or variables that need to be placed in the PDU or FCP headers. The packet is forwarded to the PACE, step 1714, which identifies the outgoing port from the local header. The local header is then stripped, step 1716 and forwarded to the proper port for transmission, step 1718.

In the event that the command is split over two or more extents, e.g., the command starts in one extent and ends in another, then the PPU must hold the R2T or XFR_RDY of the second extent until the data transfer is complete to the first extent, thus ensuring a sequential data transfer from the initiator. In addition, the data offset of the R2T or XFR_RDY of the second extent will need to be modified by adding the amount of data transferred to the first extent.

Write Data Packet—Ingress

After an initiator receives an R2T or XFR_RDY packet it returns a write-data packet with the first frame of data, followed by additional frames of data until the burst is completed. FIGS. 18, 18*a*, 19 and 19*a* describe the process of sending a frame of data from the Initiator to the physical data stores that store the mirrored data (see step 806 of FIG. 4B).

Figure 18:
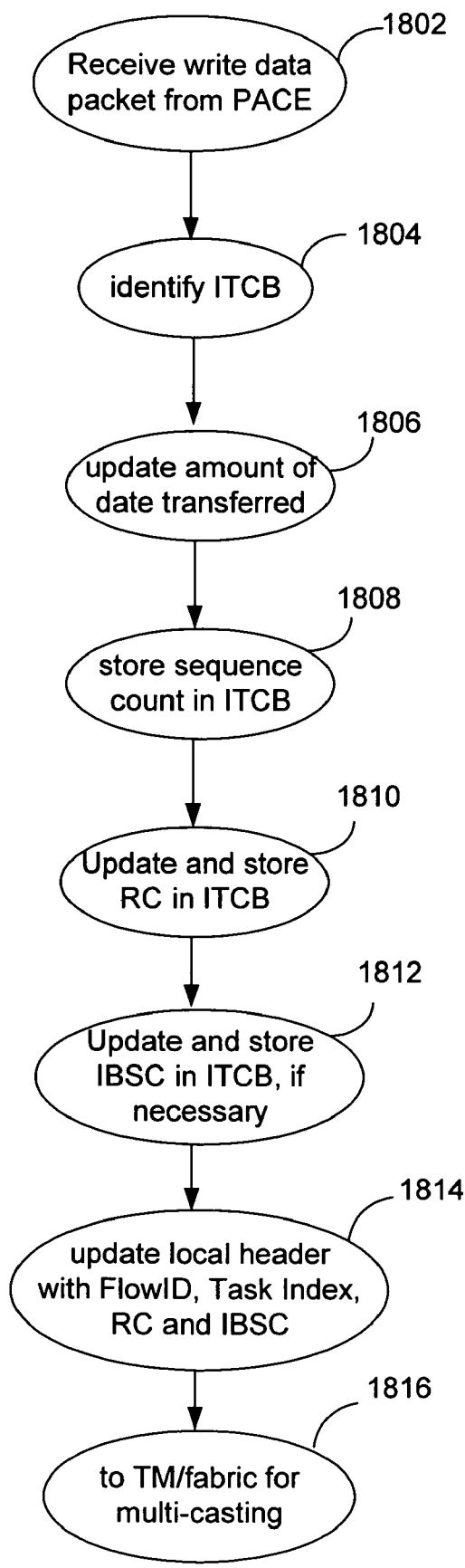
FIG. 18 is a flow diagram illustrating a virtualization process in the ingress direction for write data packets or frames, in accordance with an embodiment of the invention.

Referring to FIGS. 18 and 18*a* when a write-data iSCSI PDU or FC IU is received from an initiator, step 1802, the ITCB to which the packet belongs must be identified, step 1804. Usually, the ITCB can be identified using the RX_ID or the target_task_tag, which is the same as the Task Index in some embodiments. The SPU further identifies that received packets are in order. In some circumstances, however, the initiator will transfer unsolicited data: data that is sent prior to receiving an R2T or XFR_RDY. In such a case, the PPU must find the ITCB by a search through the outstanding tasks of a particular virtual target. But if the ITCB is not found, then the packet is discarded. If the ITCB is found, the total amount of data to be transferred is updated in the ITCB, step 1806.

The packet received from the initiator will have a sequence count relative for the current burst. With iSCSI, the Write Data PDU of FIG. 5C is received in step 1802, with a sequence count DataSN starting at zero and counting up in subsequent PDUs to the end of the burst. With FC, the framer header of FIG. 5F will have sequence identification SEQ_ID and a sequence count SEQ_CNT, where the sequence count increases in subsequent frames until the end of the burst. This sequence count is stored in the ITCB in step 1808.

The sequence count received in the packet from the initiator will start at zero and count up in subsequent packets to the end of the burst, then reset to zero and count up again, etc. The PPU will also maintain a Running Count (RC), which starts at zero and counts up in each data frame until all data has been written for the particular write request command. This Running Count, therefore, acts like a frame counter. The Running Count is updatred and stored in the ITCB and incremented in step 1810.

The PPU also maintains a Ingress Base Sequence Count (IBSC), which is the value of the Running Count at the beginning (first frame) of the current burst. The IBSC is stored in the ITCB and updated, if necessary, in step 1812.

The FlowID, Task Index, RC and IBSC are added to the local header of the packet, step 1814. The packet is then forwarded to the traffic manager and ultimately to the switch fabric, step 1816. The packet is multi-cast to each of the PPUs associated with the FlowID. For example, if the data is being mirrored in two devices (a first copy in device D1 and a second copy in device D2), then the packet is multi-cast to the PPU for D1 and the PPU for D2. Therefore, in one embodiment, the PPU for D1 and the PPU for D2 receive the same packet.

In the event that a command is split between two extents because the command starts in one and ends in the second, the PPU must determine the extent to which the particular data belongs and forward the data packet to the correct egress PPU. After completing the data transfer on the first extent, the PPU checks if the R2T or XFR_RDY of the second extent was received. Until the data transfer is completed on the first extent, the data will not be sent to the second extent to ensure sequential transfer.

In one embodiment, frames that are received at a PPU are transmitted in the order as received, but internally the frames may not always be processed in the same order that they are received and transmitted.

Write Data Packet—Egress

Figure 19:
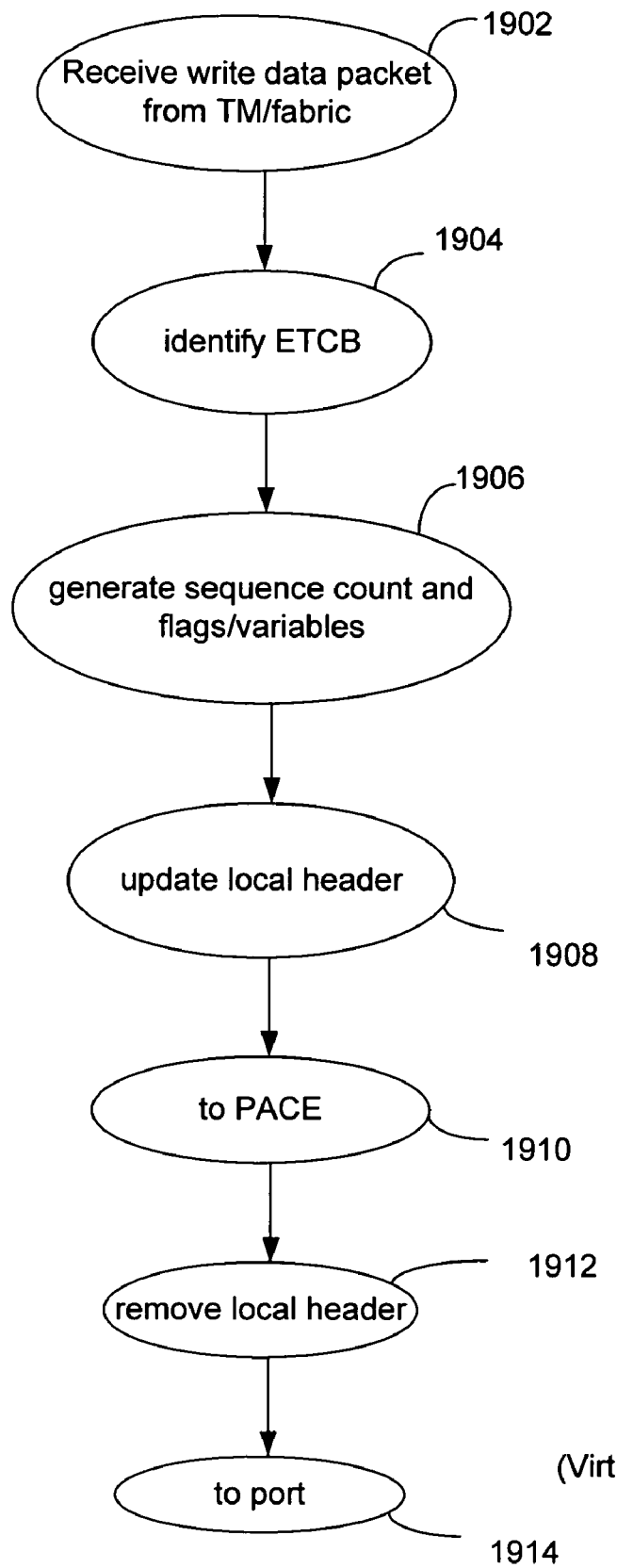
FIG. 19 is a flow diagram illustrating a virtualization process in the egress direction for write data packets or frames, in accordance with an embodiment of the invention.

Referring to FIGS. 19 and 19*a*, when a write-data packet is received from the switch fabric (via the traffic manager) at one of the PPUs, step 1902, the ETCB for the packet needs to be identified, step 1904. Typically, the ETCB can be identified using the Task Index in the local header. Once the ETCB is found, using the information inside the ETCB, the PPU generates a new sequence count (iSCSI DataSN or FCP SEQ_CNT), step 1906, along with any other flags and variables, e.g, data offset, for the PDU or FCP frame header. The local header is updated with the TCP Control Block Index or the FCP D_ID from the PTD, step 1908. The port number is also added to the local header. The finished iSCSI PDU or FCP frame is sent to the PACE, step 1910, which removes the local header, step 1912, and forwards the packet to the appropriate port, 1914. In the event that the command is split between two extents, the data offset of the packet to the second extent should be adjusted.

Generating Sequence Count

Figure 20:
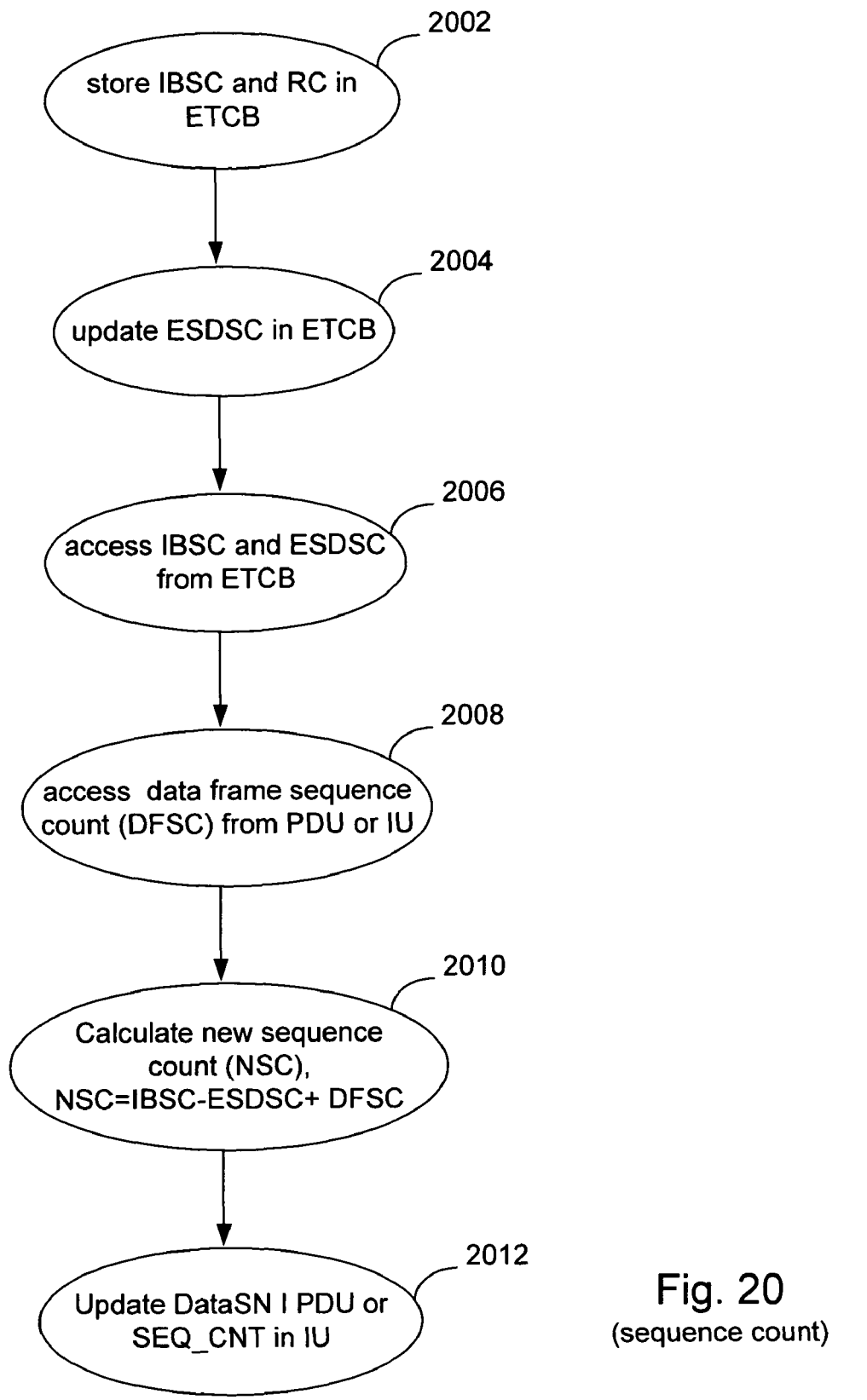
FIG. 20 is a flow diagram illustrating an embodiment of a process generating sequence count.

FIG. 20 is a flow chart describing the process for generating the sequence count. The process of FIG. 20 is performed as part of step 1906 of FIG. 19. In step 2002, the egress PPU reads the IBSC and the RC from the local header and stores both values in the ETCB. The egress PPU calculates a value called the Egress Storage Device Sequence Count (ESDSC), which is the value of the running count RC at the beginning of the sequence for the storage device associated with the particular egress PPU. Remember that each of the member storage devices can have different sequences since the burst sizes can be different. The ESDSC will be updated, if necessary, at the beginning of a sequence for the storage device associated with the particular egress PPU in step 2004.

In step 2006, the PPU accesses the IBSC and the ESDSC from the ETCB. In step 2008, the PPU accesses the data frame sequence count (DFSC), which is the DataSN in the iSCSI PDU or the SEQ_CNT in the FC IU. In step 2010, the PPU calculates a new sequence count (NSC), where:

$$NSC=IBSC-ESDSC+DFSC.$$

In one embodiment, the IBSC and the ESDSC are guaranteed to be consistent, because both values are updated at the end of each burst when no data frames are pending.

In step 2012, the sequence count in the packet is updated to the value calculated for NSC. That is, if the packet is iSCSI, then the DataSN is updated to the value calculated for NSC in step 2010. If the packet is FC, then the SEQ_CNT is updated to the value calculated for NSC in step 2010. In an alternative embodiment, rather than update an existing packet, the PPU will create a new packet (PDU or IU) that includes the new sequence count NSC.

EXAMPLE

To better understand the above description, an example is provided. In this example, assume that an Initiator I is writing 16K of data to a virtual storage device VSD. The virtual storage device VSD is being mirrored so that one copy of the data is being stored in storage device A and a second copy of the data is being stored in storage device B. To start the write process, the Initiator I will send a write command to the switch. That command will be received at an ingress PPU (see step 1402 of FIG. 14). The write command will be sent to an egress PPU for device A and an egress PPU for device B (see step 1502). The two egress PPUs will forward the commands to device A and device B (see step 1518 of FIG. 15). Assume that device A returns a transfer ready reply with a burst size of 4K, and that device B returns a transfer ready reply with a burst size of 8K (see step 1602 of FIG. 16). The original PPU that received the write command from the Initiator will receive the transfer ready replies (step 1702 of FIG. 17) and create a new transfer ready reply with a burst size of 4K (step 1706 of FIG. 17), which is the smaller of the two burst sizes. That new transfer ready will be sent to the Initiator I. The Initiator I will then send a first 1K frame of data, which will be multi-cast to the egress PPU for device A and the egress PPU for device B (see step 1816 of FIG. 18). The two egress PPUs will generate new sequence counts (see step 1906) according to the process of FIG. 20. Subsequently, the Initiator I will then send second, third and fourth 1K frames of data, which will be multi-cast to the egress PPU for device A and the egress PPU for device B, and which will result in the generation of new sequence counts according to the process of FIG. 20. At this point, 4K of data has been written. Since the smallest burst size was 4K, the Initiator must now wait for another transfer ready reply before it can send additional data associated with the current write command.

Figure 17:
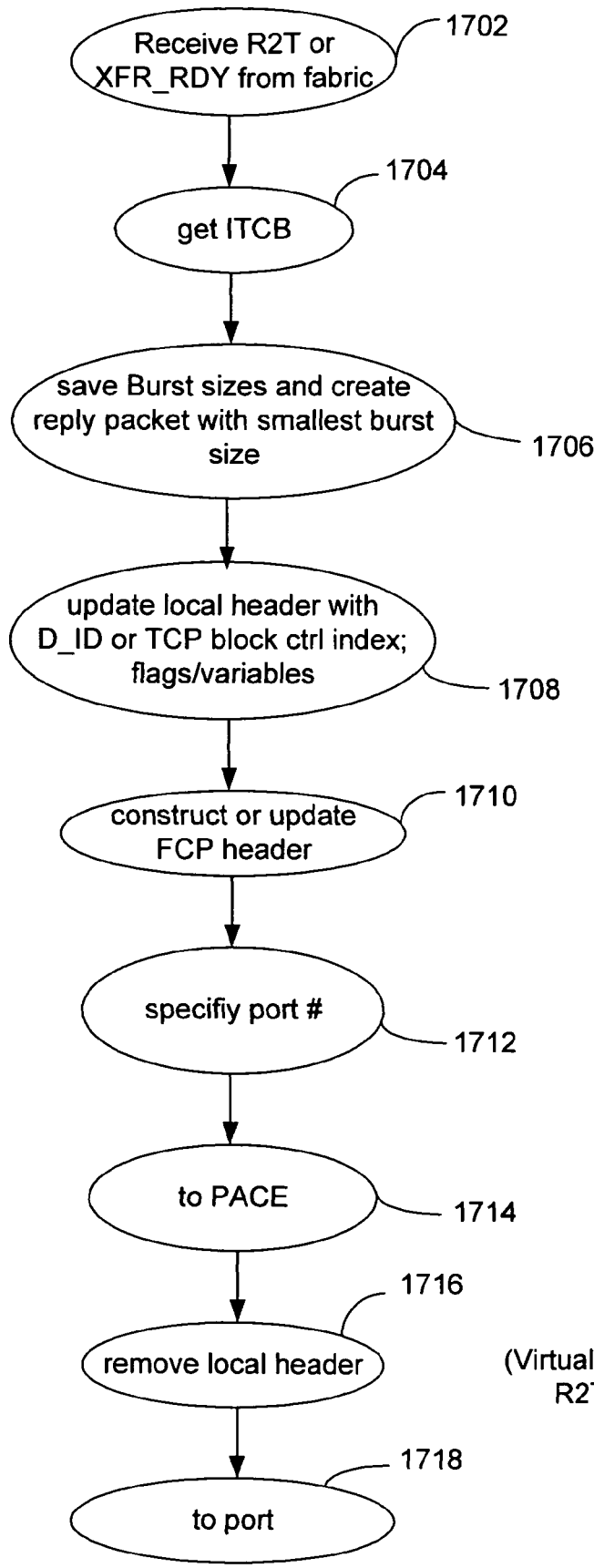
FIG. 17 is a flow diagram illustrating a virtualization process in the egress direction for R2T/XFR_RDY packets or frames, in accordance with an embodiment of the invention.

The original PPU that received the write command from the Initiator will receive the second transfer ready reply (step 1702 of FIG. 17) from device A and create a new transfer ready reply with a burst of 4K (step 1706 of FIG. 17). That new transfer ready will be sent to the Initiator I. The Initiator I will then send a fifth 1K frame of data, which will be multi-cast to the egress PPU for device A and the egress PPU for device B (see step 1816 of FIG. 18). The two egress PPUs will generate new sequence counts (see step 1906) according to the process of FIG. 20. Subsequently, the Initiator I will then send sixth, seventh and eighth 1K frames of data, which will be multi-cast to the egress PPU for device A and the egress PPU for device B, and which will result in the generation of new sequence counts according to the process of FIG. 20. At this point, 8K of data has been written. Since the smallest burst size was 4K, the Initiator must now wait for another transfer ready reply before it can send additional data associated with the current write command. This process will continue until all 16K of data (16 frames, each frame having 1K of data) has been written.

Below is a table that depicts the Running Count RC, SEQ_ID from the Initiator—SEQ_ID (I), the SEQ_CNT from the Initiator—SEQ_CNT (I), the IBSC, the ESDSC calculated by the egress PPU for storage device A—ESDSC (A), the SEQ_ID in the packet sent from the egress PPU to device A—SEQ_ID (A), the SEQ_CNT added to the packet (in step 2012) sent from the egress PPU to device A—SEQ_CNT (A), the ESDSC calculated by the egress PPU for storage device B—ESDSC (B), the SEQ_ID in the packet sent from the egress PPU to device B—SEQ_ID (B), and the SEQ_CNT added to the packet (in step 2012) sent from the egress PPU to device B—SEQ_CNT (B), for all sixteen data frames.

| | Frame | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| RC | 0 | 1 | 2 | 3 | 4 | 5 | 6 | 7 | 8 | 9 | 10 | 11 | 12 | 13 | 14 | 15 |
| SEQ_ID (I) | 0 | 0 | 0 | 0 | 1 | 1 | 1 | 1 | 2 | 2 | 2 | 2 | 3 | 3 | 3 | 3 |
| SEQ_CNT (I) | 0 | 1 | 2 | 3 | 0 | 1 | 2 | 3 | 0 | 1 | 2 | 3 | 0 | 1 | 2 | 3 |
| IBSC | 0 | 0 | 0 | 0 | 4 | 4 | 4 | 4 | 8 | 8 | 8 | 8 | 12 | 12 | 12 | 12 |
| ESDSC (A) | 0 | 0 | 0 | 0 | 4 | 4 | 4 | 4 | 8 | 8 | 8 | 8 | 12 | 12 | 12 | 12 |
| SEQ_ID (A) | 0 | 0 | 0 | 0 | 1 | 1 | 1 | 1 | 2 | 2 | 2 | 2 | 3 | 3 | 3 | 3 |
| SEQ_CNT (A) | 0 | 1 | 2 | 3 | 0 | 1 | 2 | 3 | 0 | 1 | 2 | 3 | 0 | 1 | 2 | 3 |
| ESDSC (B) | 0 | 0 | 0 | 0 | 0 | 0 | 0 | 0 | 8 | 8 | 8 | 8 | 8 | 8 | 8 | 8 |
| SEQ_ID (B) | 0 | 0 | 0 | 0 | 0 | 0 | 0 | 0 | 1 | 1 | 1 | 1 | 1 | 1 | 1 | 1 |
| SEQ_CNT (B) | 0 | 1 | 2 | 3 | 4 | 5 | 6 | 7 | 0 | 1 | 2 | 3 | 4 | 5 | 6 | 7 |

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for writing to a mirrored target, comprising:
receiving a data unit at an ingress processing unit and multi-casting a message to a first egress processing unit and a second egress processing unit, said message including said data unit and sequencing information;
providing said data unit with a first sequence number to a first data store comprising said first egress processing unit calculating said first sequence number based on sequencing information and a transfer size for said first data store, and said first egress processing unit sending said first sequence number and said data unit to said first data store; and
providing said data unit with a second sequence number to a second data store comprising said second egress processing unit calculating a second sequence number based on sequencing information and a transfer size for said second data store, and said second egress processing unit sending said second sequence number and said data unit to said second data store, wherein
said receiving a data unit further includes said ingress processing unit determining a value of a running frame count at a beginning of a sequence from an initiator;
said sequencing information includes said value of said running frame count at said beginning of said sequence from said initiator and a data frame sequence count for said data unit;
said first egress processing unit calculating said first sequence number includes said first egress processing unit calculating a value of said running frame count at a beginning of a sequence for said first data store;
said first sequence number is calculated by said first egress processing unit by subtracting said value of said running frame count at said beginning of said sequence for said first data store from said value of said running frame count at said beginning of said sequence from said initiator and adding said data frame sequence count for said data unit;
said second egress processing unit calculating said second sequence number includes said second egress processing unit calculating a value of said running count at a beginning of a sequence for said second data store; and
said second sequence number is calculated by said second egress processing unit by subtracting said value of said running count at said beginning of said sequence for said second data store from said value of said running frame count at said beginning of said sequence from said initiator and adding said data frame sequence count for said data unit.

2. A method according to claim 1, wherein:
said data unit is in a Fiber Channel IU.

3. A method according to claim 1 wherein:
said data unit is in an iSCSI PDU.

4. A method according to claim 1, further comprising:
sending a write command to said first data store and said second data store;
receiving a first reply from said first data store and a second reply from said second data store, said first reply indicates a first transfer size, said second reply indicates a second transfer size; and
informing said initiator of said first transfer size or said second transfer size, whichever is smaller.

5. A method according to claim 1, wherein:
said calculating said first sequence number comprises subtracting a value of a running frame count at a beginning of a sequence for said first data store from a value of said running frame count at a beginning of a sequence from an initiator and adding a data frame sequence count for said data unit; and
said calculating said second sequence number comprises subtracting a value of a running frame count at a beginning of a sequence for said second data store from said value of said running frame count at said beginning of said sequence from said initiator and adding said data frame sequence count for said data unit.

6. A method according to claim 1, wherein:
said steps of receiving a data unit, providing said data unit with a first sequence number and providing said data unit with a second sequence number are performed without buffering said data unit.

7. A method according to claim 1, wherein:
said steps of receiving a data unit, providing said data unit with a first sequence number and providing said data unit with a second sequence number process said data unit at wire speed.

8. A method for writing to a mirrored target, comprising:
receiving a data unit for storage on a first data store, said first data store mirrors a second data store;
receiving sequencing information for said data unit;
determining a sequence number for said data unit relative to said first data store, said sequence number is based on said sequencing information; and
providing said sequence number and said data unit to said first data store, wherein said determining a sequence number includes subtracting a value of a running frame count at a beginning of a sequence for said first data store from a value of said running frame count at a beginning of a sequence from an initiator and adding a data frame sequence count for said data unit.

9. A method according to claim 8, wherein:
said sequencing information includes said running frame count, said value of said running frame count at said beginning of said sequence from said initiator and said data frame sequence count for said data unit.

10. A method according to claim 9, wherein:
said steps of receiving a data unit, determining a sequence number and providing said sequence number are performed by an egress processing unit associated with said first data store;
said data unit is received from an ingress processing unit;
said data frame sequence count for said data unit was received at said ingress processing unit from said initiator and sent to said egress processing unit with said data unit; and
said value of said running frame count at said beginning of said sequence from said initiator is calculated by said ingress processing unit.

11. A method according to claim 8, wherein:
said steps of receiving a data unit, determining a sequence number and providing said sequence number are performed without buffering said data unit.

12. A method according to claim 8, wherein:
said steps of receiving a data unit, determining a sequence number and providing said sequence number process said data unit at wire speed.

13. A method according to claim 8, further comprising:
sending a write command to said first data store and said second data store;
receiving a first reply from said first data store and a second reply from said second data store, said first reply indicates a first transfer size, said second reply indicates a second transfer size; and informing said initiator of a burst size, said burst size is said first transfer size or said second transfer size, whichever is smaller;

wherein said data frame sequence count for said data unit is based on said burst size.

14. One or more processor readable storage devices having processor readable code embodied on said one or more processor readable storage devices, said processor readable code for programming one or more processors to perform a method comprising:

receiving a data unit for storage on a first data store, said first data store mirrors a second data store;

receiving sequencing information for said data unit;

determining a sequence number for said data unit relative to said first data store, said sequence number is based on said sequencing information; and providing said sequence number and said data unit to said first data store, wherein said determining a sequence number includes subtracting a value of a running frame count at a beginning of a sequence for said first data store from a value of said running frame count at a beginning of a sequence from an initiator and adding a data frame sequence count for said data unit.

15. One or more processor readable storage devices according to claim 14, wherein:

said steps of receiving a data unit, determining a sequence number and providing said sequence number are performed without buffering said data unit; and said steps of receiving a data unit, determining a sequence number and providing said sequence number process said data unit at wire speed.

16. An apparatus for writing to a mirrored target, comprising:

one or more ports;

one or more processing units in communication with said one or more ports, said one or more processing units receive data units that are to be stored in multiple data stores and translate sequence counts in said data units differently for different data stores accepting different transfer sizes, said one or more processing units translate sequence counts by updating an initial sequence count with one or more new sequence counts; and said one or more new sequence counts for a particular data unit are calculated by subtracting a value of a running frame count at a beginning of a sequence for a particular data store from a value of said running frame count at a beginning of a sequence from an initiator and adding a data frame sequence count for said particular data unit.

17. An apparatus according to claim 16, wherein:

said one or more processing units include an ingress processing unit, a first egress processing unit and a second egress processing unit;

said ingress processing unit is in communication with an initiator, said first ingress processing unit receives a first data unit from said initiator and multi-casts a message with said first data unit to said first egress processing unit and said second egress processing unit, said message includes a running frame count, said message includes a value of said running frame count at a beginning of a sequence from said initiator and a sequence count from said initiator;

said first egress processing unit is in communication with a first data store, said first egress processing unit translates said sequence count from said initiator by subtracting a value of said running frame count at a beginning of a sequence for a first data store from said value of said running frame count at said beginning of said sequence from an initiator and adding said sequence count from said initiator; and said second egress processing unit is in communication with a second data store, said second egress processing unit translates said sequence count from said initiator by subtracting a value of said running frame count at a beginning of a sequence for a second data store from said value of said running frame count at said beginning of said sequence from an initiator and adding said sequence count from said initiator.

18. An apparatus according to claim 17, wherein:

said first egress processing unit sends a first write command to said first data store;

said second egress processing unit sends said first write command to said second data store;

said first data store replies to said first write command with a first transfer size;

said second data store replies to said first write command with a second transfer size; and said ingress processing unit receives said first transfer size and said second transfer size and returns whichever is smaller to said initiator so that said initiator can use said smaller of said first transfer size and said second transfer size to create said sequence count from said initiator.

19. An apparatus according to claim 16, wherein:

said data units can be within packets in accordance with an iSCSI protocol or in accordance with a Fiber Channel protocol.

20. An apparatus according to claim 16, wherein:

said one or more processing units are capable of processing said data units without buffering.

21. An apparatus according to claim 16, wherein:

said one or more processing units are capable of processing said data units at wire speed.

22. An apparatus for writing to a mirrored target, comprising:

one or more processing units; and one or more ports in communication with said one or more processing units, said one or more port are in communication with an initiator and at least two storage devices;

said one or more processing units receive a data unit from said initiator, calculate a first sequence number for said data unit with respect to a first storage device of said at least two storage devices and calculate a second sequence number for said data unit with respect to a second storage device of said at least two storage devices; and said data unit and said first sequence number are provided to said first storage device via said one or more ports, and said data unit and said second sequence number are provided to said second storage device via said one or more ports, wherein said first sequence number is calculated by subtracting a value of a running frame count at a beginning of a sequence for said first data store from a value of said running frame count at a beginning of a sequence from said initiator and adding a data frame sequence count for said particular data unit; and said second sequence number is calculated by subtracting a value of a running frame count at a beginning of a sequence for said second data store from said value of said running frame count at a beginning of a sequence from said initiator and adding said data frame sequence count for said particular data unit.

23. An apparatus according to claim 22, wherein:
said one or more processing units include an ingress processing unit, a first egress processing unit and a second egress processing unit;
said ingress processing unit is in communication with an initiator, said first ingress processing unit receives a first data unit from said initiator and multi-casts a message with said first data unit to said first egress processing unit and said second egress processing unit, said message includes a running frame count, a value of said running frame count at a beginning of a sequence from said initiator and a sequence count from said initiator;
said first egress processing unit calculates said first sequence number by subtracting a value of said running frame count at a beginning of a sequence for said first data store from said value of said running frame count at said beginning of said sequence from said initiator and adding said sequence count from said initiator; and
said second egress processing unit calculates said second sequence number by subtracting a value of said running frame count at a beginning of a sequence for said second data store from said value of said running frame count at said beginning of said sequence from said initiator and adding said sequence count from said initiator.

24. An apparatus according to claim 23, wherein:
said first egress processing unit sends a first write command to said first data store;
said second egress processing unit sends said first write command to said second data store;
said first data store replies to said first write command with a first transfer size;
said second data store replies to said first write command with a second transfer size; and
said ingress processing unit receives said first transfer size and said second transfer size and returns whichever is smaller to said initiator.

25. An apparatus according to claim 22, wherein:
said data unit can be within a packet in accordance with an iSCSI protocol or in accordance with a Fiber Channel protocol.

26. An apparatus according to claim 22, wherein:
said one or more processing units are capable of processing said data unit without buffering.

27. An apparatus according to claim 22, wherein:
said one or more processing units are capable of processing said data unit at wire speed.

* * * * *